(12) United States Patent　(10) Patent No.:　US 8,725,167 B2
Siomina et al.　(45) Date of Patent:　May 13, 2014

(54) METHODS OF PROVIDING CELL GROUPING FOR POSITIONING AND RELATED NETWORKS AND DEVICES

(75) Inventors: Iana Siomina, Solna (SE); Muhammad Kazmi, Bromma (SE)

(73) Assignee: Optis Cellular Technology, LLC, Plano, TX (US)

( * ) Notice: Subject to any disclaimer, the term of this patent is extended or adjusted under 35 U.S.C. 154(b) by 346 days.

(21) Appl. No.: 13/144,766

(22) PCT Filed: Aug. 11, 2010

(86) PCT No.: PCT/SE2010/050880
§ 371 (c)(1),
(2), (4) Date: Jul. 15, 2011

(87) PCT Pub. No.: WO2012/021097
PCT Pub. Date: Feb. 16, 2012

(65) Prior Publication Data
US 2012/0040696 A1　Feb. 16, 2012

(51) Int. Cl.
*H04W 24/00*　(2009.01)
(52) U.S. Cl.
USPC ............. 455/456.1; 455/456.2; 455/456.3; 455/456.4; 455/456.5; 455/456.6
(58) Field of Classification Search
USPC ........................................ 455/456.1–456.6
See application file for complete search history.

(56) References Cited

U.S. PATENT DOCUMENTS

| 7,065,369 | B2 * | 6/2006 | Tang et al. ............... 455/456.1 |
| 7,110,775 | B2 * | 9/2006 | Ogino et al. ............. 455/456.1 |
| 7,355,995 | B2 * | 4/2008 | Ogino et al. ............. 370/328 |
| 7,742,776 | B2 * | 6/2010 | Annunziato et al. ...... 455/456.2 |
| 2004/0203380 | A1 * | 10/2004 | Hamdi et al. ............. 455/41.2 |
| 2008/0188215 | A1 | 8/2008 | Bergström et al. |
| 2010/0113063 | A1 * | 5/2010 | Han et al. ................. 455/456.1 |
| 2011/0117925 | A1 * | 5/2011 | Sampath et al. ......... 455/456.1 |

(Continued)

FOREIGN PATENT DOCUMENTS

| WO | 01/37601 A1 | 5/2001 |
| WO | 2008/060236 A2 | 5/2008 |

OTHER PUBLICATIONS

3GPP TS 36.133 V9.4.0, Technical Specification Group Radio Access Network; Evolved Universal Terrestrial Radio Access (E-UTRA); Requirements for support of radio resource management (Release 9) (Jun. 2010).

(Continued)

*Primary Examiner* — Nathan Mitchell
(74) *Attorney, Agent, or Firm* — Vincent J. Allen; Carstens & Cahoon, LLP

(57) ABSTRACT

A method of grouping cells of a radio communications network may include defining first and second groups of cells from a plurality of cells that transmit reference signals for positioning measurements. The first and second groups of cells may be defined according to a characteristic of the reference signals transmitted by the respective cells and/or of the respective cells that transmit the reference signals. Reference signals used for positioning measurements from the cells of the first group may be measured at a positioning target device. Reference signals used for positioning measurements from the cells of the second group may be measured at the positioning target device separately in time and/or separately in frequency from measuring the reference signals from the cells (103) of the first group.

36 Claims, 9 Drawing Sheets

(56) References Cited

U.S. PATENT DOCUMENTS

| | | | | |
|---|---|---|---|---|
| 2012/0015667 | A1* | 1/2012 | Woo et al. | 455/456.1 |
| 2012/0149392 | A1* | 6/2012 | Siomina et al. | 455/456.1 |
| 2012/0184302 | A1* | 7/2012 | Kazmi et al. | 455/456.5 |
| 2012/0231809 | A1* | 9/2012 | Siomina et al. | 455/456.1 |
| 2012/0270572 | A1* | 10/2012 | Siomina et al. | 455/456.6 |
| 2013/0122930 | A1* | 5/2013 | Woo et al. | 455/456.1 |

OTHER PUBLICATIONS

3GPP TS 36.355 V9.2.0, Technical Specification Group Radio Access Network; Evolved Universal Terrestrial Radio Access (E-UTRA); LTE Positioning Protocol (LPP) (Release 9) (Jun. 2010).

3GPP TS 36.211 V9.1.0, Technical Specification Group Radio Access Network; Evolved Universal Terrestrial Radio Access (E-UTRA); Physical Channels and Modulation (Release 9) (Mar. 2010).

Guolin Sun et al., entitled "Signal Processing Techniques in Network-Aided Positioning [A Survey of State-of-the-art Positioning Designs]" (IEEE Signal Processing Magazine, pp. 12-23, Jul. 2005).

3GPP TSG RAN WG2 Meeting #70bis, R2-104164, "Various Corrections and Clarifications to LPP", Qualcomm Incorporated, Mobile Competence Centre, 650, Route Des Lucioles, F-06921 Sophia-Antipolis Cedex, France, vol. RAN WG2, Stockholm, Sweden, Jun. 28-Jul. 2, 2010.

3GPP TSG-RAN WG4 Meeting #52, R4-093040, "Initial System Simulation Results for OTDOA Positioning", Ericsson, ST-Ericsson, Preliminary Positioning Simulation Results, Mobile Competence Centre, 650, Route Des Lucioles, F-06921 Sophia-Antipolis Cedex, France, Shenzhen, China, Aug. 24-Aug. 28, 2009.

International Search Report and Written Opinion mailed Mar. 28, 2012 in PCT Application No. PCT/SE2010/050880.

* cited by examiner $N_{PRS}=6$ consecutive subframes (one positioning occasion)

Cells 1,2,3,4 (Group 1) are measured during the first two time intervals

Cells $1,2,...,n^{(1)}$ (Group 1) are measured during the first two time intervals

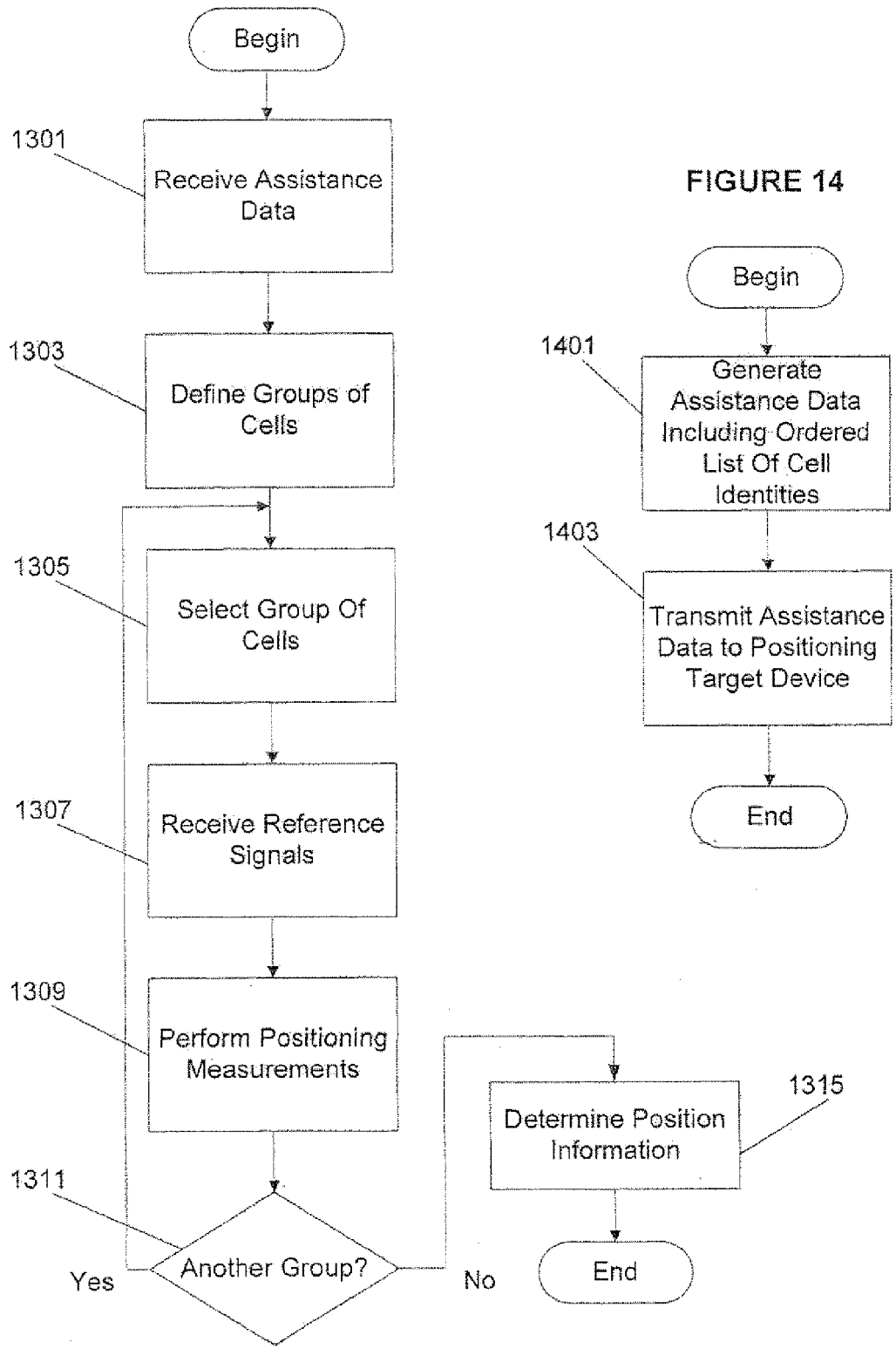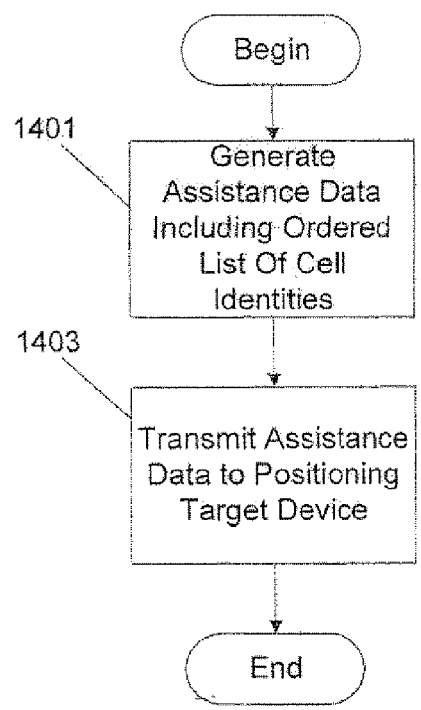

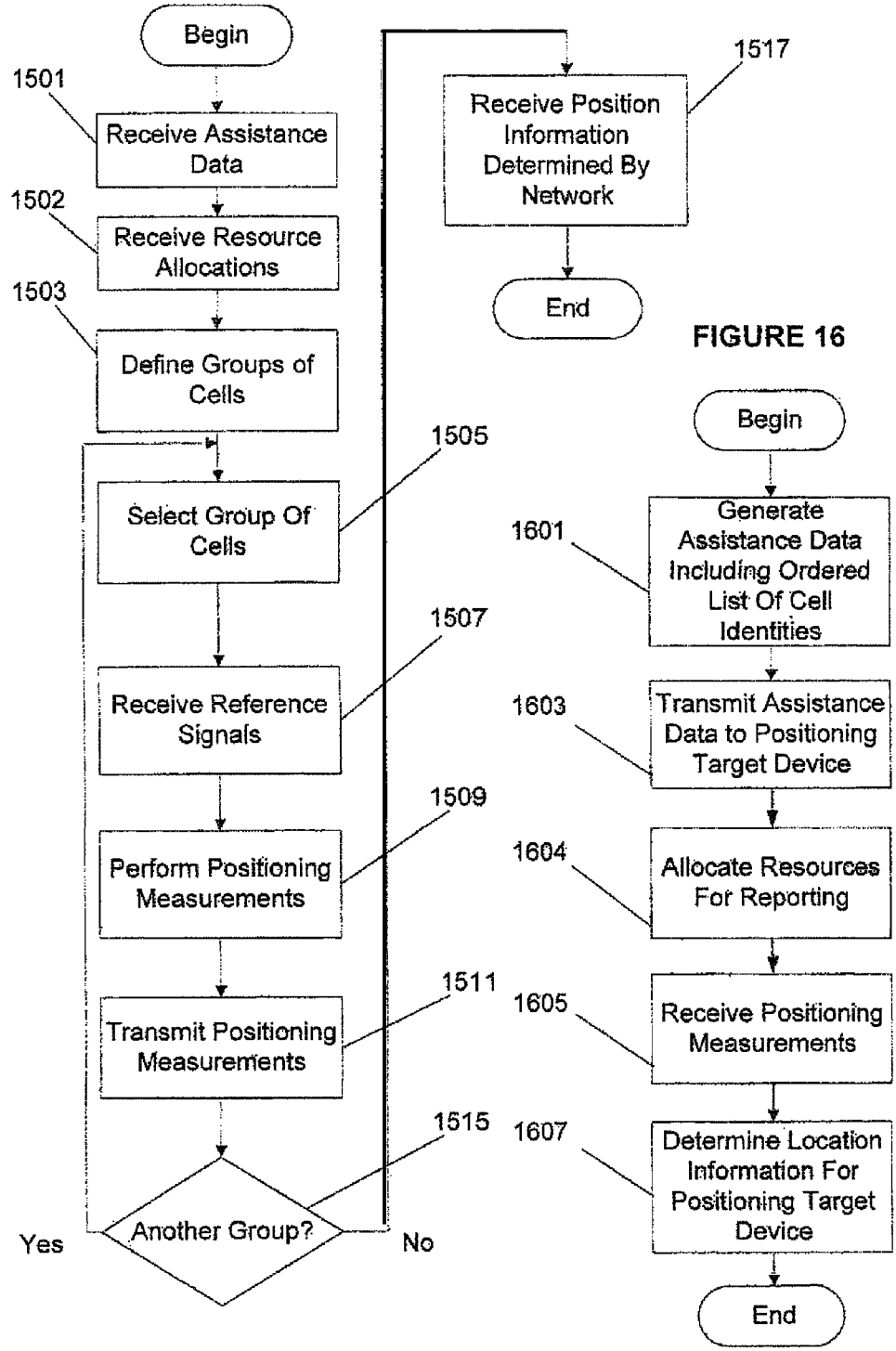

METHODS OF PROVIDING CELL GROUPING FOR POSITIONING AND RELATED NETWORKS AND DEVICES

This application is the U.S. national phase of International Application No. PCT/SE2010/050880, filed 11 Aug. 2010, the entire contents of which is hereby incorporated by reference.

BACKGROUND

The present invention relates to radio communications, and more particularly, to mobile communications networks and devices providing positioning.

In mobile communications networks, user terminal positioning may be used to support emergency services so that a precise location of a calling user terminal may be automatically determined and provided to an emergency responder (e.g., a paramedic ambulance service, a police department, a fire department, etc.). The U.S. Federal Communications Commission (FCC), for example, is requiring that a mobile communications network automatically provide a precise location for cellular radiotelephones placing an emergency 911 call. Such positioning may also be used for non-emergency services such as navigation, location aware computing, network optimization, resource management, etc.

For example, GPS (Global Positioning System) may be used to locate a user terminal using GPS satellite signals received at the user terminal. GPS positioning, however, may require inclusion of a separate GPS receiver, and/or GPS positioning may not be available indoors and/or in an urban canyon. Other positioning techniques may use terrestrial mobile communications networks. With Observed Time Difference Of Arrival (ODTA), for example, the user terminal measures time differences between positioning reference signals received from different cells (base station transmitters), and the measured time differences are used to determine a position of the user terminal. With Assisted-GPS (A-GPS), the terrestrial mobile communications network is used to improve GPS receiver performance by providing satellite constellation information to the GPS receiver. With Cell-ID, a rough user terminal position may be determined based on a cell sector being used by the user terminal during an active call. These and other positioning techniques are discussed in the reference by Guolin Sun et al., entitled "Signal Processing Techniques in Network-Aided Positioning [A Survey of State-of-the-art Positioning Designs]" (IEEE Signal Processing Magazine, pages 12-23, July 2005), the disclosure of which is hereby incorporated herein in its entirety by reference.

Notwithstanding known positioning techniques, there continues to exist a need in the art for improved positioning techniques, for example, providing increased speed and/or efficiency.

SUMMARY

According to some embodiments of the present invention, a method of grouping cells of a radio communications network may include defining first and second groups of cells from a plurality of cells that transmit reference signals for positioning measurements. The first and second groups of cells may be defined according to a characteristic of the reference signals transmitted by the respective cells and/or of the respective cells that transmit the reference signals. Reference signals used for positioning measurements from the cells of the first group may be measured at a positioning target device. Reference signals used for positioning measurements from the cells of the second group may be measured at the positioning target device separately in time and/or separately in frequency from measuring the reference signals from the cells of the first group. For example, the reference signals from the cells of the first group may be measured after measuring all of the reference signals from the cells of the first group so that the reference signals from the cells of the first and second groups are measured separately in time.

The characteristic may account for reference signal availability so that the reference signals transmitted by the respective cells of the first group are measured at the positioning target device one or more of first positioning occasions, and so that the reference signals transmitted by the respective cells of the second group are measured at the positioning target device one or more of second positioning occasions different than the first positioning occasions.

Identifying the plurality of cells may include receiving a list of the plurality of cells at the positioning target device from the radio communications network, and the list may be constructed according to a pre-defined rule of ordering the cells. In addition, the respective available positioning measurements may be reported from the positioning target device to the radio communications network in an order corresponding to the order defined by the list received from the radio communications network. Moreover, the respective available positioning measurements may be reported from the positioning target device through a serving cell to a positioning server.

The cells of the first group may be similar with respect to the characteristic, and the cells of the second group may be similar with respect to the characteristic, and the cells of the first and second groups may be different with respect to the characteristic. The characteristic, for example, may be based on at least one of cell maximum transmit power, cell bandwidth, reference signal transmit bandwidth, cell transmitter location, estimated distance between positioning target device and cell transmitter, cell transmitter geographical geometry, cell type, timing of cell transmissions of reference signals to be used for positioning measurements, signal quality, received signal strength, expected reference signal time difference, cell radio access technology, cell frequency, cell carrier status, cell operator, number of cell transmit antennas, carrier frequency, cell carrier type, service cost, reference signal muting information, cell identity, and/or reference signal pattern.

The characteristic may be based on a metric such that values of the metric for the cells of the first group are on a first side of a threshold for the metric and such that values of the metric for the cells of the second group are on a second side of the threshold for the metric. The metric, for example, may be based on: maximum cell transmit powers (so that cells of one group have maximum cell transmit powers that are higher than maximum transmit powers of cells of the other group); cell bandwidths (so that cells of one group have greater transmit bandwidths than cell bandwidths of cells of the other group); reference signal transmit bandwidths (so that cells of one group transmit references signals at greater bandwidths than cells of the other group); cell transmitter/antenna locations (so that transmitters/antennas of cells of one group are less distant from the position target device than transmitters/antennas of cells of the other group); received signal strength/quality (so that signals from cells of one group are received with greater strength/quality at the positioning target device than signals from cells of the other group); cell geometry (where cell geometry is defined as the ratio of the total received power of the cell of interest to the total received power from other cells); number of transmit antennas (so that the number of transmit antennas of each of the cells of one group is greater than the number of antennas of cells of the other group); expected reference signal time difference (so that expected reference signal time differences for cells of one group at the positioning target device are greater than expected reference signal time differences for cells of the other group at the positioning target device); and/or cell transmit frequencies (so that cell transmit frequencies for cells of one group are greater than cell transmit frequencies for cells of the other group).

Defining the first and second groups may include receiving cell identities of the plurality of the cells in an ordered list from the radio communications network, defining a group of n cells corresponding to a certain sequence of n cell identities in the ordered list (where n is an integer), and defining a group of m cells corresponding to a certain sequence of m cell identities in the ordered list (where m is an integer).

Defining the first and second groups may include selecting a subset of the plurality of cells according to a first characteristic. Cells from the subset may be assigned to the first and second groups according to a second characteristic so that the cells of the first group are similar with respect to the second characteristic and so that the cells of the second group are similar with respect to the second characteristic, with the cells of the first and second groups being different with respect to the second characteristic.

The positioning measurements may be reported from the positioning target device to the radio communications network, and after reporting the positioning measurements, identifications of the first and second groups of cells and groupings thereof may be maintained in memory of the positioning target device. After reporting the positioning measurements, a reference signal from at least one of the cells of the first and second groups may be measured using at least one of the identifications of the first and second groups of cells and groupings thereof maintained in the memory. The positioning target device may be a first mobile user terminal, and identifications of the first and second groups of cells and groupings thereof may be transmitted from the first mobile user terminal to a second mobile user terminal.

According to other embodiments of the present invention, a terminal may include a processor configured to define first and second groups of cells from a plurality of cells that transmit reference signals for positioning measurement. The first and second groups of cells may be defined according to a characteristic of the reference signals transmitted by the respective cells and/or of the respective cells that transmit the reference signals. A receiver may be coupled to the processor, and the receiver may be configured to receive reference signals used for positioning measurements from the cells of the first group. The receiver may be configured to receive reference signals used for positioning measurements from the cells of the second group, to measure the reference signals received from the cells of the first group, and to measure the reference signals received from the cells of the second group separately in time and/or separately in frequency from measuring the reference signals from cells (103) of the first group.

The characteristic may account for reference signal availability so that the reference signals transmitted by the respective cells of the first group are measured using the receiver and/or the processor during a first positioning occasion, and so that the reference signals transmitted by the respective cells of the second group are measured using the receiver and/or the processor during a second positioning occasion different than the first positioning occasion. The receiver and/or the processor may be further configured to receive a list of the plurality of cells from a radio communications network, and the list may define an order of the cells. In addition, a transmitter may be coupled to the processor, and the processor and/or the transmitter may be configured to report the respective available positioning measurements to the radio communications network in an order corresponding to the order defined by the list received from the radio communications network.

A transmitter may be coupled to the processor, and the processor and/or the transmitter may be configured to report the positioning measurements to the radio communications network. A memory may be coupled to the processor, and the memory may be configured to maintain identifications of the first and second groups of cells and groupings thereof after reporting the positioning measurements. The receiver and/or the processor may be configured to measure a reference signal from at least one of the cells of the first and second groups using at least one of the identifications of the first and second groups of cells (103) and groupings thereof maintained in the memory after reporting the positioning measurements to the radio communications network. The terminal may be a first mobile user terminal, and identifications of the first and second groups of cells and groupings thereof may be transmitted from the first mobile user terminal to a second mobile user terminal.

According to still other embodiments of the present invention, a method of providing communications in a radio communications network may include generating assistance data including an ordered list of cell identities for cells that transmit reference signals used for positioning measurements. The cell identities may be ordered according to a plurality of groups of cells to be used for position measurements at a positioning target device and the order within each group, and the plurality of groups may include first and second groups defined according to a characteristic of the reference signals transmitted by the respective cells and/or of the respective cells that transmit the reference signals. The assistance data including the ordered list of cell identities may be transmitted to the positioning target device.

Positioning measurements from the positioning target device may be received, and each of the positioning measurements may correspond to a respective one of the cell identities. In addition, the positioning measurements may be received in an order corresponding to an order defined by the ordered list of cell identities in the assistance data. Before receiving the positioning measurements, a first set of time-frequency radio resources may be allocated for the positioning target device to transmit positioning measurements corresponding to the reference signals transmitted by the first group of cells, and a second set of time-frequency radio resources may be allocated for the positioning target device to transmit the positioning measurements corresponding to the reference signals transmitted by the second group of cells. Moreover, receiving the positioning measurements may include receiving the positioning measurements corresponding to the reference signals transmitted by the first group of cells during the first time interval and receiving the positioning measurements corresponding to the reference signals transmitted by the second group of cells during the second time interval.

A first group of cells may be a group of n cells corresponding to a sequence of n cell identities in the ordered list where n is an integer, and a second group of cells may be a group of m cells corresponding to a sequence of m cell identities in the ordered list where m is an integer. The characteristic may account for reference signal availability so that the reference signals transmitted by the respective cells of the first group are transmitted during a first set of positioning occasions, and so that the reference signals transmitted by the respective cells of the second group are transmitted during a second set of positioning occasions different than the first set of positioning occasions.

The characteristic may be based on at least one of cell maximum transmit power, cell bandwidth, reference signal transmit bandwidth, cell transmitter location, estimated distance between positioning target device and cell transmitter, cell transmitter geographical geometry, cell type, timing of cell transmissions of reference signals to be used for positioning measurements, signal quality, received signal strength, expected reference signal time difference, cell radio access technology, cell frequency, cell carrier status, cell operator, number of cell transmit antennas, carrier frequency, cell carrier type, service cost, reference signal muting information, cell identity, and/or reference signal pattern.

The characteristic may include a metric such that values of the metric for the cells of the first group are on a first side of a threshold for the metric and such that values of the metric for the cells of the second group are on a second side of the threshold for the metric. The metric, for example, may be based on: maximum cell transmit powers (so that cells of one group have maximum cell transmit powers that are higher than maximum transmit powers of cells of the other group); cell bandwidths (so that cells of one group have greater transmit bandwidths than cell bandwidths of cells of the other group); reference signal transmit bandwidths (so that cells of one group transmit references signals at greater bandwidths than cells of the other group); cell transmitter/antenna locations (so that transmitters/antennas of cells of one group are less distant from the position target device than transmitters/antennas of cells of the other group); received signal strength/quality (so that signals from cells of one group are received with greater strength/quality at the positioning target device than signals from cells of the other group); cell geometry (where cell geometry is defined as the ratio of the total received power of the cell of interest to the total received power from other cells); number of transmit antennas (so that numbers of transmit antennas of cells of one group are greater than numbers of antennas of cells of the other group); expected reference signal time difference (so that expected reference signal time differences for cells of one group at the positioning target device are greater than expected reference signal time differences for cells of the other group at the positioning target device); and/or cell transmit frequencies (so that cell transmit frequencies for cells of one group are greater than cell transmit frequencies for cells of the other group).

According to yet other embodiments of the present invention, a radio communications network may include a positioning server configured to generate assistance data including an ordered list of cell identities for cells that transmit reference signals used for positioning measurements. The cell identities may be ordered according to a plurality of groups of cells to be used for position measurements at a positioning target device, and the plurality of groups may include first and second groups defined according to a characteristic of the reference signals transmitted by the respective cells and/or of the respective cells that transmit the reference signals. In addition, the positioning server may be configured to transmit the assistance data including the ordered list of cell identities to the positioning target device.

A network node may be configured to receive positioning measurements from the positioning target device with each of the positioning measurements corresponding to a respective one of the cell identities, and the positioning measurements may be received in an order corresponding to an order defined by the ordered list of cell identities. The network may be further configured to store the order of the cell identities for the target device or a given area, and the stored information may be further used for building up the assistance data. The network node may be further configured to allocate first and second time intervals for the positioning target device to transmit positioning measurements corresponding to the reference signals transmitted by the respective first and second groups of cells, and the allocation may be provided before receiving the positioning measurements. In addition, the network node may be configured to receive the positioning measurements corresponding to the reference signals transmitted by the first group of cells during the first time interval, and to receive the positioning measurements corresponding to the reference signals transmitted by the second group of cells during the second time interval.

BRIEF DESCRIPTION OF THE DRAWINGS

FIGS. 13-16 are flow charts illustrating operations of mobile communications networks and/or user terminals (UTs) according to some embodiments of the present invention.

DETAILED DESCRIPTION

Figure 1:
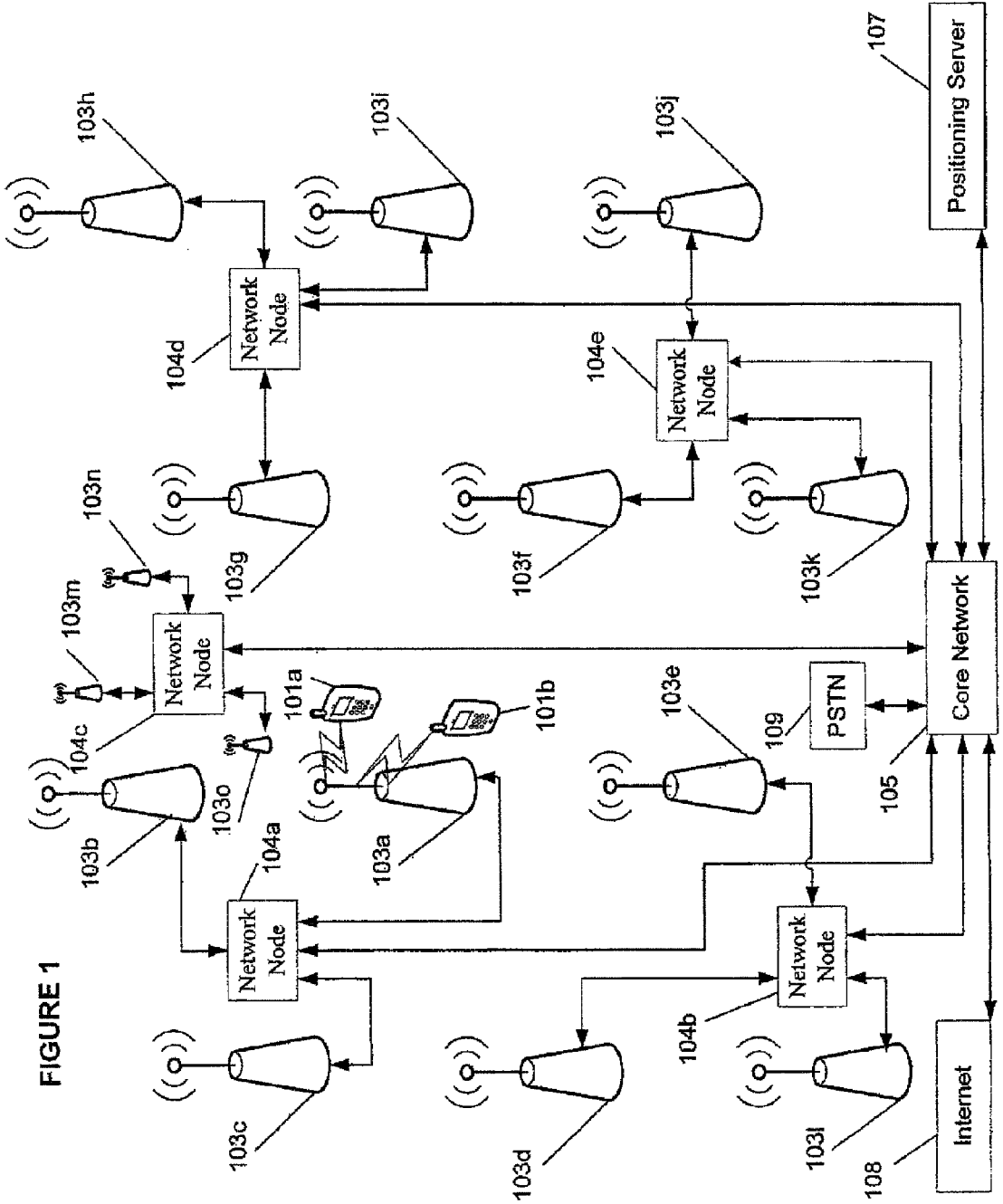
FIG. 1 is a schematic diagram of a mobile communications network according to some embodiments of the present invention.

The invention will now be described more fully hereinafter with reference to the accompanying drawings, in which embodiments of the invention are shown. This invention may however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1710 MHz to about 1785 MHz and about 1805 MHz to about 1880 MHz, PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments are disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present invention are described herein in the context of user terminals (e.g., "wireless user terminals", "wireless communication terminals", "wireless terminals", "terminals", "user equipment", etc.) that are configured to carry out cellular communications (e.g., cellular voice and/or data communications). It will be understood, however, that the present invention is not limited to such embodiments and may be embodied generally in any wireless communication terminal that is configured to transmit and receive according to one or more RATs.

According to some embodiments of the present invention shown in the schematic diagram of FIG. 1, a mobile communications network may include a plurality of cells 103$a$ to 103$o$ coupled to core network 105 through respective network nodes 104$a$ to 104$e$. By way of example, each network node 104$a$ to 104$e$ may be provided as an eNodeB (E-UT-RAN NodeB) compatible with 3GPP LTE standards, and each cell 103$a$ to 103$o$ may include a respective transmitter, receiver, and antenna used to provide service over a coverage area defined by the cell. For example, three co-located transmitting units of cells 103$a$ to 103$c$ may be coupled to network node 104$a$ to provide coverage for respective 120 degree sectors from a same location to cover 360 degrees around the location, or three cells 103$g$ to 103$i$ coupled to network node 104$d$ may be spaced apart to provide coverage over different sections of a same roadway. The transmitting units of the three cells 103$a$ to 103$e$ and associated network node 104$a$, for example, may be co-located to provide a base station with each cell 103$a$ to 103$c$ of the base station including a transmitter, a receiver, and an antenna providing service over a respective 120 degree sector, so that the three cells provide coverage over 360 degrees surrounding the base station. More generally, all elements of the radio communications network of FIG. 1 may be compatible with 3GPP LTE standards.

The primary cells 103$a$ to 103$l$ may define respective primary coverage areas, and the secondary cells 103$m$ to 103$o$ may define secondary coverage areas, and secondary coverage areas may overlap one or more primary coverage areas. Moreover, secondary cells 103$m$ to 103$o$ may transmit at lower power than primary cells 103$a$ to 103$l$ so that a secondary coverage area may be included within a respective primary coverage area. Secondary cells 103$m$ to 103$o$, for example, may be pico cells providing coverage for different floors of a same building.

Core network 105 and/or network nodes 104$a$ to 104$e$ may provide data connection/communication (e.g., via wired connection(s), wireless radio connection(s), fiber optic connection(s), microwave connection(s), and/or combinations thereof) between cells 103$a$ to 103$o$, and/or core network 105 and/or network nodes 104$a$ to 104$e$ may provide balancing of data communications between cells, coordination of handoffs between cells, connection to and/or communication with other communications networks (e.g., the Internet 108, a Public Switched Telephone Network(s) (PSTN) 109, etc.), etc. Functionalities of core network 105 and/or network nodes 104$a$ to 104$e$ may be provided at a single site separate from cells 103$a$ to 103$o$, distributed across different sites separate from cells 103$a$ to 103$o$, distributed among cells 103$a$ to 103$o$, distributed among cells 103$a$ to 103$n$ and one or more sites separate from cells 103$a$ to 103$o$, etc.

Illustrated couplings/connections between network nodes 104$a$ to 104$e$, core network 105, positioning server 107 (e.g. E-SMLC or SLP in LTE), Internet 108, and PSTN 109 are provided to generally illustrate examples of network couplings/connections that may be used, and are not meant to convey all physical and/or logical couplings/connections that may be provided in all/any networks. For example, direct physical and/or logical couplings/connections may be provided between network nodes 104$a$ to 104$d$, and/or direct physical and/or logical couplings may be provided between each of network nodes 104$a$ to 104$d$ and positioning server 107 or the terminal 101$a$ and positioning server 107. Couplings/connections beyond those illustrated in FIG. 1 have been omitted for ease of illustration because illustration of additional couplings/connections is not required for a complete understanding of the disclosure herein. Accordingly, positioning server 107 may be directly coupled/connected to network nodes 104$a$ to 104$e$ and without direct coupling/connection to core network 105. Moreover, while positioning server 107 is shown separate from core network 105 and network nodes 104$a$ to 104$e$, functionality of positioning server 107 may be implemented by one or more elements of core network 105 and/or network nodes 104$a$ to 104$e$.

Cells 103$a$ to 103$o$ may be deployed according to a hierarchical network architecture with primary cells 103$a$ to 103$l$ being deployed initially as a macro-layer to provide service/coverage for a service area. One or more secondary cells 103$m$ to 103$o$ (e.g., micro-base stations, relays, repeaters, etc.) may be deployed subsequently to provide extra capacity in high traffic areas, to provide enhanced services (e.g., increased data rate services, mobile internet access, etc.), to provide improved coverage, to provide improved service quality, to provide a Radio Access Technology (RAT) not available through primary cells, etc. A network operator may thus initially deploy primary cells 103$a$ to 103$l$ to support communications services over a service area according to a RAT available at the time of initial deployment, and then, the network operator may later deploy secondary cells 103$m$ to 103$o$ over time to selectively add capacity and/or to support one or more subsequent RATs.

In addition, positioning server 107 may be coupled to network nodes 104$a$ to 104$e$ and/or cells 103$a$ to 103$o$ through core network 105. As discussed in greater detail below, positioning server 107 may be used to provide positioning services for user terminals 101 in communication with cells 103$a$ to 103$o$ of the radio communications network.

The mobile communications network of FIG. 1 may thus provide wireless voice and/or data communications for mobile user terminals (UTs) 101$a$ to 101$b$ (also referred to as user equipment or UE). Each user terminal 101, for example, may be a radiotelephone, a smartphone, or any other positioning target device in communication with a cell or cells 103 of the radio communications network. Communications between UT 101$a$ and the communications network, for example, may be provided through a proximate cell 103a, and voice and/or data communications between UT 101a and the communications network may be handed off to other cells 103 as UT 101 moves through an area covered by the mobile communications network. As discussed in greater detail below, UT 101a may also use transmissions from cells 103 to generate position measurements used to determine a position/location of UT 101a. A base station, e.g. a home NodeB or a pico cell or a relay or sensor, may also be a positioning target, though not illustrated in FIG. 1.

Figure 2:
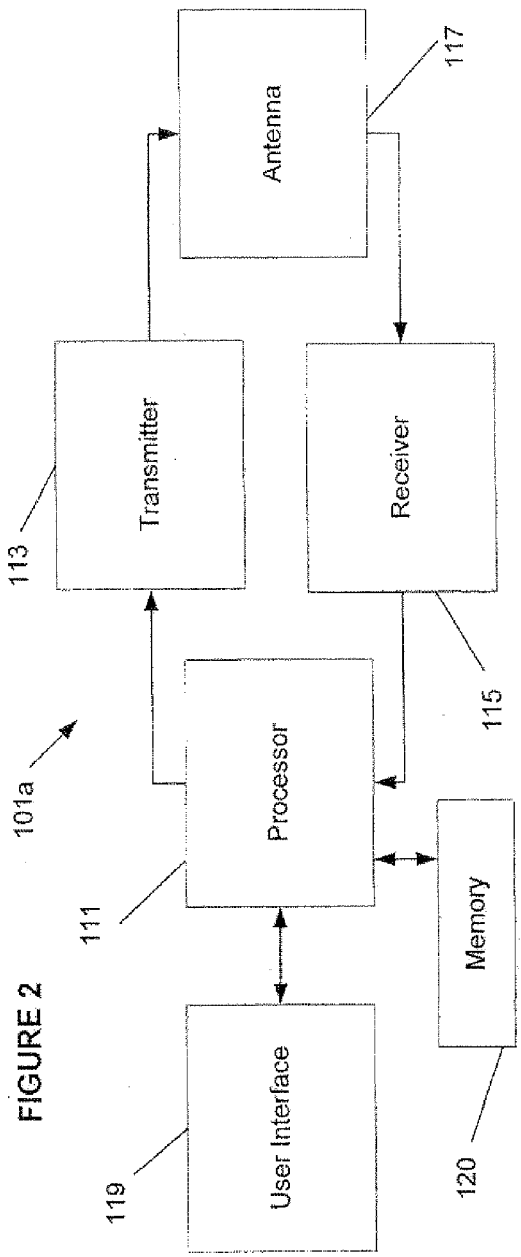
FIG. 2 is a block diagram of a user terminal (UT) according to some embodiments of the present invention.

FIG. 2 is a block diagram illustrating UT 101a according to some embodiments of the present invention. As shown, UT 101a may include processor 111, transmitter 113, receiver 115, antenna 117, and user interface 119. Processor 111 may process voice/data communications transmitted through transmitter 113 and antenna 117, and received through antenna 117 and receiver 115. User interface 119 may include a speaker, a microphone, a keypad(s), a display, a touch sensitive display, etc. to support radiotelephone voice communications, Internet browsing, text messaging, e-mail, etc. Receiver 115 and antenna 117 may be further configured to receive GPS positioning signals from GPS satellites, and processor 111 may be configured to process the GPS positioning signals and/or to transmit the GPS positioning signals through transmitter 113, antenna 117, cell 103a, and core network 105 to positioning server 107.

Figure 3:
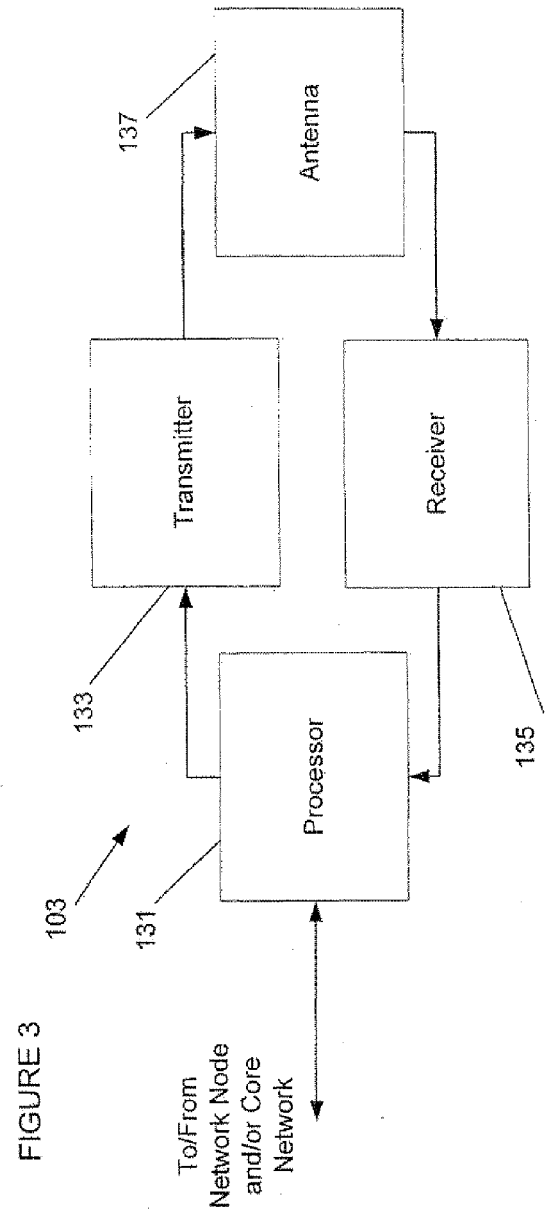
FIG. 3 is a block diagram of a cell of a mobile communications network according to some embodiments of the present invention.

FIG. 3 is a block diagram illustrating a network cell 103 according to some embodiments of the present invention. As shown, network cell 103 may include processor 131, transmitter 133, receiver 135, and antenna 137, and processor 131 may be directly or indirectly coupled to core network 105. Processor 131, for example may be coupled to core network 105 through a respective network node 104. According to some embodiments of the present invention, processor 131 and/or elements/functionalities thereof may be implemented a respective network node 104 coupled to the cell 103. Processor 131 may process voice/data communications transmitted through transmitter 133 and antenna 137, and received through antenna 137 and receiver 135 to support communications with a plurality of user terminals 101 in a coverage area supported by the network cell 103. While not explicitly shown in FIG. 3, transmitter 133, receiver 135, and antenna 137 of a cell 103 may be configured to provide coverage for a sector (e.g., a 120 degree sector) of a 360 degree coverage area for the respective network node 104, and 2 or more such cells (e.g., three 120 degree cells) may provide coverage for the full 360 degree coverage area.

As discussed in greater detail below, each cell 103 may transmit positioning reference signals (PRS) that may be used to determine a location of UT 101a. According to some embodiments of the present invention, UT 101a may measure time differences (e.g., reference signal time differences (RSTDs)) between receipt of positioning reference signals (PRS) from two different cells 103, and three or more of these time differences (measured using at least three different and spaced-apart cells 103) may be used to determine/estimate a location of UT 101. Processor 111 of UT 101a may determine/estimate a location of UT 101a using the measured time differences; UT 101a may transmit the measured time differences through serving cell 103a and core network 105 to positioning server 107 so that positioning server 107 may determine/estimate a location of UT 101a using the measured time differences; and/or operations of determining/estimating location of UT 101a may be shared between UT 101a and positioning server 107.

According to some embodiments of the present invention, processor 111 of UT 101a may define first and second groups of cells 103 from the radio communications network that transmit positioning reference signals (PRS) that may be used by UT 101a for positioning measurement. More particularly, the first and second groups of cells 103 may be defined according to a characteristic of the positioning reference signals transmitted by the respective cells 103 and/or according to a characteristic of the respective cells 103 that transmit the reference signals. UT 101a receiver 115 may be configured to receive positioning reference signals from the cells 103 of the first and second groups, and UT 101a processor 111 may be configured to measure the positioning reference signals received from cells 103 of the first group, and to measure the reference signals received from cells 103 of the second group after measuring the reference signals received from cells 103 of the first group.

More particularly, the first and second groups of cells 103 may be defined by an order of cells identified in a list received from positioning server 107 (through serving cell 103a). For example, UT 101a receiver 115 and processor 111 may receive assistance data including the list of the plurality of cells 103 from serving cell 103a, and the list may define an order of cells 103. For example, the first group of cells may be defined as a group of n cells 103 corresponding to a sequence of n cell identities in the ordered list (where n is an integer), and the second group of cells may be defined as a group of m cells 103 corresponding to a sequence of m cell identities in the ordered list (where m is an integer). Position server 107, for example, may define the groups of cells for UT 101a based on an estimated location of UT 101a (e.g., determined based on a location of serving cell 103a, transmissions of UT 101a, etc.). Moreover the first and second groups of cells 103 may have the same number of cells (i.e., m and n are the same) or different numbers of cells (i.e., m and n are different).

When the radio communications network (e.g., positioning or location server 107) and UT 101a both know the order of cells 103 in the list provided with the assistance data and at least the grouping principle and/or the number and/or the size of groups and/or the measurement period per group are also known in the node responsible for allocating/scheduling the time-frequency resource for measurement reporting (e.g. eNodeB in LTE), network communications resources may be allocated for UT 101a to report position measurements based on this known order and/or accounting for the number of cell groups. For example, UT 101a may report position measurements for the cells of the first and second groups in an order defined by the list received as assistance data and/or position measurements may be reported in groups corresponding to the groups of cells. For example, network node 104a may allocate a first set of time-frequency radio resources for UT 101a processor 111 and transmitter 113 to report/transmit positioning measurements for cells of the first group, and a second set of time-frequency radio resources for UT 101a processor 111 and transmitter 113 to report/transmit positioning measurements for cells of the second group. The positioning measurements may be transmitted through serving cell 103a, network node 104a, and core network 105 to positioning server 107 where a position of UT 101a may be estimated/calculated.

In general, the characteristic (used to define the first and second groups of cells 103) may be provided so that cells 103 of the first group are similar with respect to the characteristic, so that cells 103 of the second group are similar with respect to the characteristic, and so that cells 103 of the first and second groups are different with respect to the characteristic. For example, the characteristic may be a metric such that values of the metric for the cells 103 of the first group are on a first side of a threshold for the metric and such that values of the metric for the cells 103 of the second group are on a second side of the threshold for the metric. By grouping cells according to similarities of cells and/or PRS signals transmitted thereby, UT 101a may be able to perform positioning measurements more quickly and/or more efficiently. The metric, for example, may be based on: maximum cell transmit powers (so that cells of one group have maximum cell transmit powers that are higher than maximum transmit powers of cells of the other group); cell bandwidths (so that cells of one group have greater transmit bandwidths than cell bandwidths of cells of the other group); reference signal transmit bandwidths (so that cells of one group transmit references signals at greater bandwidths than cells of the other group); cell transmitter/antenna locations (so that transmitters/antennas of cells of one group are less distant from the position target UT than transmitters/antennas of cells of the other group); received signal strength/quality (so that signals from cells of one group are received with greater strength/quality at the positioning target UT than signals from cells of the other group); cell geometry (where cell geometry is defined as the ratio of the total received power of the cell of interest to the total received power from other cells); number of transmit antennas (so that numbers of transmit antennas of cells of one group are greater than numbers of antennas of cells of the other group); expected reference signal time difference (so that expected reference signal time differences for cells of one group at the positioning target UT are greater than expected reference signal time differences for cells of the other group at the positioning target UT); and/or cell transmit frequencies (so that cell transmit frequencies for cells of one group are greater than cell transmit frequencies for cells of the other group).

The characteristic (used to define the first and second groups of cells 103) may account for positioning reference signal availability so that the reference signals transmitted by the respective cells 103 of the first group are received through the receiver 115 during a first positioning occasion, and so that the reference signals transmitted by the respective cells of the second group are received through the receiver 115 during a second positioning occasion different than the first positioning occasion. As discussed in greater detail below, positioning reference signals may be muted at different cells during different positioning occasions so that all cells 103 do not transmit positioning reference signals at the same time. By grouping cells so that all cells of a same group transmit positioning reference signals during a same positioning occasion, or more generally, so that all cells of the same group transmit reference signals used for positioning measurements during the same time period intended for measurements at the positioning target UT's receiver, UT 101a may be able to measure all positioning reference signals from cells of the first group during a first positioning occasion and to measure all positioning reference signals from cells of the second group during a second positioning occasion so that positioning operations may be performed more quickly and/or efficiently. Some cells of the first and/or second groups may transmit positioning reference signals during both the first and second positioning occasions provided that all cells of the first group transmit positioning reference signals during the first positioning occasion and provided that all cells of the second group transmit positioning reference signals during the second positioning occasion. Moreover, cells of the same group are not required to transmit positioning reference signals during all of the same positioning occasions, as long as cells of the same group transmit positioning reference signals during the one positioning occasion used by UT 101a to measure the positioning reference signals from the cells of that group.

According to some embodiments of the present invention, the characteristic (used to define the first and second groups of cells 103) may be based on at least one of cell 103 maximum transmit power, cell 103 bandwidth, reference signal transmit bandwidth, cell 103 transmitter 133 location, estimated distance between UT 101a and cell 103 transmitter, cell 103 transmitter geographical geometry, cell 103 type, timing of cell 103 transmissions of reference signals to be used for positioning measurements, signal quality received at cell 101a from cell 103, received signal strength at UT 101a from cell 103, expected reference signal time difference at UT 101a from cell 103, cell 103 radio access technology, cell 103 frequency, cell 103 carrier status, cell 103 operator, number of cell 103 transmit antennas, carrier frequency, cell 103 carrier type, service cost, reference signal muting information, cell identity, and/or reference signal pattern.

Moreover, the first and second groups may be defined according to a plurality of characteristics. For example, a subset of the plurality of cells 103 may be selected according to a first characteristic such as signal quality/power received at UT 101a. The subset, for example, may include cells 103 having signals (e.g., PRS signals, control signals, etc.) that are received at UT 101a with sufficient power and/or quality. Cells 103 from the subset may then be assigned to the first and second groups according to a second characteristic so that the cells 103 of the first group are similar with respect to the second characteristic and so that the cells 103 of the second group are similar with respect to the second characteristic, and so that the cells 103 of the first and second groups are different with respect to the second characteristic. The second characteristic may be any of the characteristics discussed above.

As noted above, UT 101a processor 111 and transmitter 113 may report the positioning measurements through serving cell 103a, network node 104a, and core network 105 to positioning server 107 where a location of UT 101 may be estimated/calculated. In addition, processor 111 may be configured to maintain cell identifications of the first and second groups of cells 103 and the grouping information in memory 120 after reporting the positioning measurements to the radio communications network. The identifications of the first and second groups of cells 103 and the grouping information may thus be used for subsequent positioning measurements provided that UT 101a does not move too far. In addition or in an alternative, the identifications of the groups of cells 103 (maintained in memory 120) may be subsequently used for other positioning calculations (e.g., AECID), for mobility measurements, for tracking area update, etc.

The identifications of the first and second groups of cells 103 may be stored in UT 101a memory 120 for future use, for example, until sufficient movement of UT 101a is detected (e.g., upon assignment to a different serving cell) and/or until a sufficient period of time has passed. By reusing the identifications stored in memory, network resources may be conserved by reducing a number of transmissions used to provide assistance data from positioning server 107 and/or network node 104a and/or cell 103a to UT 101a. Furthermore, UT 101a processing resource utilization may also be optimized by using the stored information instead of building up the groups from scratch every time.

In addition, UT 101a may be configured to share identifications of the first and second groups of cells 103 (stored in memory 120) with another user terminals such as UT 101b, for example, using a short range wireless link, such as a Bluetooth link. Because a short range wireless link to used to transmit the information, UTs 101a and 101b may have approximately a same location so that identification of the first and second groups of cells 103 is sufficiently valid for both UTs 101*a* and 101*b*. For example, UT 101*b* may scan on the short range wireless link to determine if suitable positioning assistance data is available from a nearby UT before requesting such positioning assistance data from the radio communications network. If suitable positioning assistance data is available form a nearby UT, network resources may be conserved by reducing a number of transmissions between UT 101*b* and the radio communications network.

According to some embodiments of the present invention, positioning server 107 may be configured to generate assistance data including an ordered list of cell identities for cells 103 that transmit reference signals used for positioning measurements. As discussed above, the cell 103 identities may be ordered according to a plurality of groups of cells 103 to be used for position measurements at UT 101*a*, and the plurality of groups may include first and second groups defined according to the characteristic of the reference signals transmitted by the respective cells 103 and/or of the respective cells 103 that transmit the reference signals. Moreover, positioning server 107 may be configured to transmit the assistance data including the ordered list of cell identities through core network 105, network node 104*a*, and serving cell 103*a* to positioning target UT 101*a*, the transmission can be, for example, over LPP (LTE Positioning Protocol between E-SMLC and the UE).

According to some embodiments of the present invention, serving network node 104*a* may be configured to receive positioning measurements from UT 101*a* through serving cell 103*a* with each of the positioning measurements corresponding to a respective one of the cell identities provided by positioning server. Moreover, the positioning measurements may be received at serving network node 104*a* (through serving cell 103*a*) in an order corresponding to an order defined by the ordered list of cell identities (defined by positioning server 107). The measurements in this case could be transmitted, for example, over the RRC protocol.

Serving network node 104*a* may be further configured to allocate first and second time intervals for UT 101*a* to transmit positioning measurements corresponding to positioning reference signals transmitted by the respective first and second groups of cells 103 before receiving the positioning measurements. Moreover, serving network node 104*a* may be configured to receive the positioning measurements corresponding to the reference signals transmitted by the first group of cells 103 during the first time interval, and to receive the positioning measurements corresponding to the reference signals transmitted by the second group of cells 103 during the second time interval.

Some embodiments of the present invention relate to interference management in wireless communications networks and in particular to wireless network architectures that employ positioning reference signal muting and use measurements of positioning reference signals from multiple cells to determine position/location and/or to support location-based services. Moreover, positioning reference signals from a cell or cells may be muted during some intervals provided for positioning reference signals. According to some embodiments of the present invention, cell grouping may be provided to facilitate UT 101 positioning measurements, resource scheduling may be provided for positioning measurement reports transmitted from UT 101 to the network, and/or assistance data may be organized at the network to support grouping of cells 103 at UT 101 for positioning measurements.

Identifying a geographical location of UT 101 in a network may enable a variety of commercial and non-commercial services (e.g., navigation assistance, social networking, location-aware advertising, emergency calls, etc.). Different location services may have different positioning accuracy requirements imposed by the application. In addition, regulatory requirements on positioning accuracy for basic emergency services may exist in some countries (e.g., FCC E911 in the United States).

In many environments, UT 101 position may be accurately estimated using positioning methods based on GPS (Global Positioning System). In addition, radio communications networks may provide assistance for UT 101 to improve UT 101 receiver 115 sensitivity and GPS startup performance (Assisted-GPS positioning or A-GPS). GPS and/or A-GPS receivers, however, may be not available in all wireless UTs. Furthermore, GPS positioning may fail in indoor environments and/or in urban canyons where reception from GPS satellites may be diminished. Complementary terrestrial positioning methods have also been developed. For example, Observed Time Difference of Arrival (OTDOA) has been standardized by the $3^{rd}$ Generation Partnership Project (3GPP).

With OTDOA, UT 101 measures timing differences for downlink positioning reference signals received from multiple distinct cells at different locations. For each (measured) neighbor cell, UT 101 measures a Reference Signal Time Difference (RSTD) which is a relative timing difference between the neighbor cell and a reference cell. UT 101 position estimate is then found as the intersection of hyperbolas corresponding to the measured RSTDs. At least three measurements from geographically dispersed base stations with a good geometry (relative to UT 101) are used to solve for two coordinates of UT 101 and the receiver clock bias. To solve for position, precise knowledge of the transmitter locations and transmit timing offset may be needed. Position calculation may be conducted, for example, by positioning server 107 (e.g., compatible with an E-SMLC or Evolved Serving Mobile Location Center according to the LTE control plane) using positioning measurements (e.g., RSTDs provided by UT 101) and/or by UT 101, The former approach may correspond to a UT-assisted positioning mode, while the latter approach may corresponds to a UT-based positioning mode.

To enable positioning in LIE (Long Term Evolution) and to facilitate positioning measurements of a sufficient quality and/or for a sufficient number of distinct locations, new physical signals dedicated for positioning (e.g., positioning reference signals or PRSs) have been introduced and low-interference positioning subframes have been specified in 3GPP ($3^{rd}$ Generation Partnership Project).

PRSs (positioning reference signals) are transmitted from cell 103 antenna ports according to pre-defined patterns. A frequency shift, which is a function of PCI (Physical Cell Identification), can be applied to the specified PRS patterns to generate orthogonal patterns and to model effective frequency reuse of six (making it possible to significantly reduce neighbor cell interference on the measured PRS and thus improve positioning measurements). Even though PRSs have been specifically designed for positioning measurements and in general are characterized by better signal quality than other reference signals, current standards do not mandate use of PRSs. Other reference signals (e.g., cell-specific reference signals or CRSs) may also/alternatively be used for positioning measurements.

Figure 4:
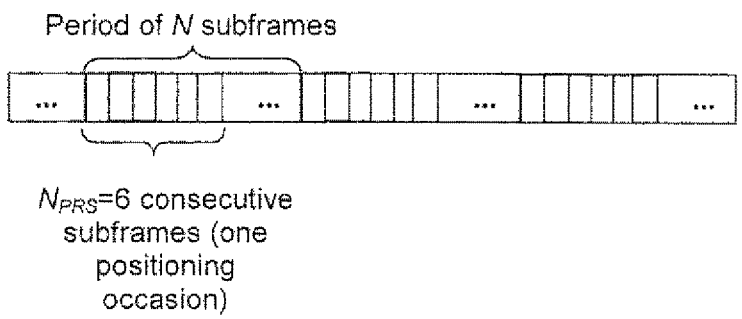
FIG. 4 is a diagram illustrating positioning subframe allocation in time for a single cell according to some embodiments of the present invention.

PRSs may be transmitted in pre-defined positioning subframes grouped by several consecutive subframes ($N_{PRS}$), i.e., one positioning occasion. FIG. 4 is a diagram illustrating positioning subframe allocation in time for a single cell 103. Positioning occasions may occur periodically with a certain periodicity of N subframes (i.e., a time interval between two positioning occasions) as shown in FIG. 4. The standardized periods N are 160 ms (milliseconds), 320 ms (milliseconds), 640 ms (milliseconds), and 1280 ms (milliseconds), and the number of consecutive subframes are 1, 2, 4, and 6.

OTDOA positioning PRS signals from multiple distinct locations (i.e., from multiple geographically-separated/spaced-apart cells) may need to be measured, and UT 101*a* receiver 115 may have to deal with PRS signals that are much weaker than those received from the serving cell 103*a*. Furthermore, without approximate knowledge of when the measured signals are expected to arrive in time and/or without knowing PRS patterns (i.e., timing patterns of PRS transmissions from network cells), UT 101*a* may need to search signals within a relatively large window which may impact time and/or accuracy of measurements as well as UT 101*a* complexity. To facilitate UT 101*a* measurements of PRS time differences, the radio communications network may transmit assistance data (AD) to UT 101*a*, and the assistance data may include reference cell information, a neighbor cell list including PCIs (Physical Cell Identities) of neighbor cells, a number of consecutive downlink subframes, PRS transmission bandwidth, frequency, etc. PRS signals may be muted or transmitted at reduced power, which may then apply for all PRS resource elements within the same subframe over the entire PRS transmission bandwidth. In a special case, PRS signals may be transmitted with zero power, or simply not transmitted.

PRS muting configurations are not pre-defined by existing standards. The muting configuration/pattern may be decided by the network and optionally signaled to UT 101*a* together with other OTDOA assistance data. If the muting configuration is not signaled for a particular cell, UT 101*a* may assume that muting is not applied in this cell.

There may be few restrictions on PRS muting pattern configurations. That is, the network may have full flexibility, except, for example, that positioning requirements specified in 3GPP TS 36.133 may have to be met. For example, a minimum number M of positioning occasions used to measure at least n cells and side conditions may apply for all subframes of at least L=M/2 PRS positioning occasions. For each cell when applicable, the muting configuration may be signaled as a bitstring where a bit (0 or 1) indicates whether PRS is muted in the cell in the positioning occasion defined by the bit position in the bitstring and the reference time point for the muting pattern. See, 3GPP TS 36.355.

A heterogeneous network may include cells 103 using network nodes 104 (which together may be referred to as base stations) belonging to different base station types or classes (e.g., any combination of macro base stations, micro base stations, pico base stations, and home base stations, also known as home Node Bs or femto base stations). A maximum output power of lower power base stations (e.g., pico base stations, home base stations, etc.) may be much lower that output power of the macro base station. For example, in both WCDMA (Wide Band Code Division Multiple Access) and E-UTRAN (Evolved Universal Terrestrial Radio Access Network) FDD (Frequency Division Duplex) and TDD (Time Division Duplex), the home base station (HBS) maximum output power ($P_{f,\ max,\ antenna\_HBS}$) may be limited to 20 dBm for a non-MIMO (Multiple-Input Multiple-Output) case, 17 dBm per antenna port in an embodiment with two transmit antennas, or 14 dBm per antenna port in an embodiment with four transmit antennas. A maximum total output power of a pico base station (PBS) may be 24 dBm ($P_{f,\ max,\ antenna\_PBS}$); a maximum power also scaled with the number of antenna ports. This relationship can be generalized as follows:

$$P_{f,max,antenna\_HBS} = 20 \text{ dBm} - 10 * \log_{10}(N), \text{ and}$$

$$P_{f,max,antenna\_PBS} = 24 \text{ dBm} - 10 * \log_{10}(N),$$

where N is the number of transmit antenna ports at the home base station.

A maximum output power of a macro base station, however, may be determined by the manufacturers, but typically output power may be 43 dBm per antenna port for 5 MHz (WCDMA or LTE) and 46 dBm per antenna port for 10 MHz or larger bandwidth.

In general, control channel power will be lower for lower power class base stations. More particularly, output power of control channels including reference signals, synchronization signals, broadcast channels, PRS, etc. for micro, pico, and home base stations may be substantially lower compared to that of macro base stations. Accordingly, even without muting, PRS received power and quality received from pico and home base station cells 103*m* to 103*o* at UT 101*a* (which is operating in a heterogeneous network and in particular which is connected to macro base station serving cell 103*a*) may be substantially lower.

Even in a macro network, different network cells/nodes (such as different eNodeBs) may transmit at different maximum output powers, for example, in an E-UTRAN network deployment where the cells have different bandwidths (e.g., 1.4 MHz and 10 MHz). Macro cells, for example, may transmit at different maximum output powers when: (1) different bandwidths are provided by cells on the same carrier; and/or (2) different bandwidths are provided by cells on different carriers. The former may affect intra-frequency measurements whereas the latter may affect inter-frequency measurements.

From a measurement time and accuracy point of view, efficiency may be improved by measuring all cells in parallel, thereby reducing total measurement period and reducing errors induced by the evolved time. For OTDOA according to the 3GPP standard, for example, the network may provide assistance data for up to 24 cells per frequency layer and for up to 3 frequency layers (i.e., up to 72 cells in total), so that with a fully parallel measurement approach, all of these may have to be measured in parallel. Even though in a typical macro network deployment so many cells may not be available at one location, UT 101 may have to be designed for what is specified in the standard, especially since heterogeneous dense deployments are becoming more and more popular.

A fully parallelized measurement approach may require more processing power and larger buffers, which may increase UT 101*a* complexity and cost. A fully parallelized measurement approach may thus be difficult to provide in a relatively small and/or cheap UT 101*a*. Complexity and/or cost of the receiving UT 101*a* may be reduced by serializing the measurements (i.e., by performing measurements cell by cell, for example, with one cell being measured during each positioning occasion). The serialized approach may be a realistic implementation, for example, for mobility measurements when PRS signals from relatively few cells need to be measured, and the measurements are not the timing measurements unlike the positioning measurements (when factors such as time drifts may significantly impact measurement accuracy). With practical transmitters and receivers, accuracy of timing-based measurements may degrade with time, for example, due to clock drifts which may be different at cell 103 transmitter 133 and UT 103*a* receiver 115 or can be different for different cell 103 transmitters 133. Furthermore, serialized measurements may significantly increase the measurement time thereby increasing positioning response time which may be crucial for time-critical applications such as emergency calls. This time delay may be unacceptable in the presence of mobility when a position of UT 101*a* relative to the measured radio cells 103 may change significantly during the measurement period. With time, errors in the received assistance data (e.g., the expected RSTD or Reference Signal Time Difference and RSTD uncertainty) may increase.

A compromise may be to apply a group-serialized measurement approach by which the measured cells 103 are grouped, and the cells 103 in each group are measured in parallel, while the groups of cells 103 are measured in a serial manner. For positioning, the size of groups may be a trade-off between desired positioning accuracy and UE 101*a* receiver 115 complexity. Compared to a fully parallelized approach, a measurement time with a group-serialized approach may be approximately proportional to a number of groups of cells 103 to be measured. An approach to cell grouping may be to create groups of cells 103 such that the cells 103 in each group have approximately the same timing.

Given a list of cells 103 to be measured, difficulty of forming cell groups may increase when different cells 103 transmit positioning reference signals (PRSs) at different times (e.g., when PRS muting is used). Furthermore, in heterogeneous networks, different cells 103 and/or network nodes 104 may transmit at different transmit powers. PRS quality from lower power class cells 103 (e.g., micro nodes or base stations cells 103*m* to 103*o*) may be substantially lower compared to PRS quality from macro base station cells 103*a* to 1031. This justifies using certain measurement time intervals for certain cells and using muting or low-interference subframe patterns, i.e. when some signals from some cells may be not available. Implementing some embodiments of the invention where, for example, the signal availability and such measurement patterns are accounted for in grouping shall benefit the positioning performance in such heterogeneous scenarios. Also, within the macro network, the macro cells 103*a* to 1031 (e.g., nodes or base stations) may transmit at different powers (especially if cell bandwidths are different for different cells). Accordingly, grouping of cells based only on the estimated timing may be inefficient because hearability of a lower power cell may be insufficient if measured when a PRS is being transmitted from a higher power cell, even if both cells are located approximately at the same distance from the estimated UT 101*a* location.

Complexity of cell grouping may further increase when measurement gaps (e.g., inter-frequency measurement gaps, are used in the network). With inter-frequency measurements, measurements on a frequency different from that of serving cell 103*a* may only be possible during short periods of time referred to as inter-frequency measurement gaps. Complexity of cell grouping may further increase if some enhanced ICIC (Inter-Cell Interference Coordination) schemes are adopted by 3GPP, which is currently being discussed. For example, schemes based on time-division multiplexing (currently being discussed for LTE Rel. 10 and later) from UT 101*a* receiver 115 point of view may essentially be viewed as another variant of muting. Similar to muting, measurements according to these time division multiplexing schemes may be conducted within non-contiguous intervals.

In addition, with the current 3GPP TS 36.355 standard, the network may order cells 103 in the neighbor cell list sent in the assistance data according to the criteria: "best measurement geometry." This criteria, however, may be undefined in the standard, and this criteria may be confusing at least because the geomtry may be defined for serving cell 103*a* and may be undefined for a set of other cells. At the same time, the order of cells in the list may be important because the order may provide additional information for UT 101*a* which may be used to further optimize/improve UT 101 measurements. Because cell grouping is not defined as such for positioning, methods may not be defined to use this information. Use of this information (cell grouping criteria), however, may benefit both UT 101*a* and the radio communications network. Furthermore, if the "geometry" term is not clearly defined (which is the case in the current version of 36.355, v9.2.1, 2010-06), the network and the UE may interpret it differently which will lead to the ambiguity when trying to use this information or the order may be regarded by the UE as non-trusted, which will make it difficult to optimize the measurement and reporting processes.

According to some embodiments of the present invention, methods may be provided: to determine similarity principles and characterization metrics for cells 103 used by UT 101*a* for positioning measurements; to define cell groups used by UT 101*a* for positioning measurements; to sort lists of cells included in positioning assistance data that is transmitted from the radio communications network to UT 101*a*; to acquire cell grouping information used to define cell groups; and/or to use cell grouping information at UT 101*a* and at the radio communications network, for example, to schedule positioning measurement reports, to store and re-use the cell grouping information at UT 101*a*, etc. Positioning determinations are discussed herein by way of example with respect to UT 101*a*, but positioning determinations and related methods may be implemented according to embodiments of the present invention in/with/for any positioning target device, such as, a user equipment (UE) device, a relay, a base station, a beacon, a sensor, etc.

Similarity principles and characterization metrics may be used to define groups of cells 103 to be used by UT 101*a* for positioning measurements. Given a set of cells to be used for positioning measurements at UT 101*a*, the cells may be characterized using a metric (qualitative or quantitative), and a difference (absolute or relative) in the metric for two cells, 103*x* and 103*y*, may be used to characterizes a degree of similarity of the two cells. Cell grouping may then be based on a similarity principle, by which a group includes a set of cells that are similar to each other with respect to the characterization metric.

In some embodiments, cells from different cell groups may be measured during non-overlapping time intervals so that the groups are orthogonal in time. In other embodiments, the characterization metric may be a conditional metric (e.g., the metric applies together with a condition which has to be met for cells to be included in any of the cell groups). As a result, if the condition is time-dependent, the grouping result may also be time-dependent (e.g., when muting is taken into account to exclude a cell 103 from the cell groups to be measured during the time when the cell is muted).

Given N, the N cells may be characterized by a metric and sorted in an order (e.g., a descending or ascending order) of the metric, $q_i$, i=1, ..., N, where, e.g., $q_i \le q_{i+1}$. The cells 103 may be grouped with n cells 103 per group based on the similarity principle. The groups may thus be defined as follows:

group 1 comprising the set of cells $\{i\}$, i=1, ..., n,
group 2 comprising the set of cells $\{i\}$, i=n+1, ..., 2*n, etc.

Although in this example, the number of cells per group is fixed and is the same in both groups, a fixed number of cells in a group is not a requirement of cell grouping principles according to embodiments of the present invention, and different groups may include different numbers of cells.

Choice of a characterization metric(s) used may influence efficiency of cell grouping for positioning measurements. According to some embodiments of the present invention, the characterization metric(s) may be one or a combination of any of the following metrics/parameters.

The position index of a cell identity in the sorted cell list provided in the assistance data which is transmitted to UT 101 from the network, for example, from the serving cell and/or positioning server 107 (e.g., via LTE Positioning Protocol, or LPP, by E-SMLC or SLP in E-UTRAN), may be utilized in cell grouping at the UE side The network may have responsibility to sort the cells based on available information. The network may be expected to sort cells according to a best measurement geometry (e.g., defined as a ratio of the own cell total received power to the other cell total received power, i.e., with respect to the serving cell) at an a-priori location estimate of the target device [3GPP TS 36.355]. According to embodiments of the present invention in heterogeneous networks and/or in any network including nodes with different output power levels in different cells and/or cells with different bandwidths (e.g., lower power on 1.4 MHz calls and higher power on 10 MHz cells), the cells may be sorted, for example, according to one or more of the following embodiments.

According to some embodiments, cells 103 may be sorted in increasing order according to effective neighbor (or reference) geometry with respect to a reference cell i for which it is defined (which may or may not be serving cell 103a), and transmit power differences of nodes relative to the reference cell may be taken into account as follows:

$$\frac{\sum_{j \neq i} p_j^{rx}}{p_i^{rx}} = \frac{\sum_{j \neq i} \frac{p_j^{tx}}{p_i^{tx}} g_j}{g_i},$$ (Equation 1)

where $p_i^{rx}$ and $p_j^{rx}$ are the received power of the reference and neighbor cell, respectively, $g_i$ and $g_j$ are the power gain factors for these cells, and $p_i^{tx}$ and $p_j^{tx}$ are the transmit powers of the corresponding cells.

According to some embodiments, cells 103 may be sorted in decreasing order of the expected and/or measured received signal strength (at UT 101a), which may be known from E-CID (Enhanced Cell IDentificiation) at least for some cells and/or which may be estimated. The following relation may hold:

$$SINR_i = \frac{1}{\left(\frac{1}{SINR_{ref}} + 1\right) \cdot \frac{p_{ref}^{rx}}{p_i^{rx}} - 1}.$$ (Equation 2)

$SINR_i$ and $SINR_{ref}$ are the SINRs (Signal-to-Interference-and-Noise Ratios) of cell i and the reference cell (with both SINRs being defined on the same set of mutually interfering cells), respectively. In equation 2, $p_i^{rx}$ and $p_{ref}^{rx}$ are the received signal powers from cell i and the reference cell, respectively. It follows from equation 2 that for a given and fixed SINR, $SINR_{ref}$, of the reference cell signal and a given received signal strength $p_{ref}^{rx}$ of the reference cell, it is the received signal strength of cell i that defines the signal quality from the cell i Accordingly, by sorting the cells by the received signal power, the cells may be considered to be sorted by the signal quality, which may be a desired property of a neighbor cell list from UT 101a perspective.

According to some embodiments, the cells may be sorted in decreasing order of expected or measured relative signal strengths defined with respect to a reference cell, $$\frac{p_i^{rx}}{p_{ref}^{rx}},$$ (Equation 3)

This sorting may be essentially the same as that provided with respect to the received signal strength, but may still be used, depending on what type of information is available in the network (e.g., relative information may be available, but absolute received signal strength may be unavailable).

According to some embodiments of the present invention, the cells may be sorted in decreasing order of estimated and/or measured SINRs (e.g., based on E-CID measurements and/or fingerprinting) of signals used for OTDOA positioning measurements. Further variants of the four embodiments discussed above may also be envisioned and the corresponding mathematical relations derived.

Received signal quality may be calculated at the target device using the relationship of equation 2, for example, based on historical measurements of neighbor cell RSRP (Reference Signal Received Power) conducted for mobility or E-CID positioning (stored and reused in the positioning target UT 101a) and/or based on RSRP and RSRQ (Reference Signal Received Quality) measurements of one of the cells (e.g., the serving cell and/or the reference cell).

Expected reference signal time differences (RSTD) may be provided in the assistance data. As an example of combination of RSTD with the received signal strength or quality, the list may be sorted in the decreasing order of the signal strength or quality, and the X strongest cells may be provided as the first X cells in the sorted list. These first X cells may be sorted by RSTD by applying one of the disclosed cell grouping algorithms, with X being either a given number or the number of cells that meet at least a certain received signal strength or quality level. For example, by only measuring PRS from cells providing relatively high signal strength at UT 101a, power consumption at UT 101a and/or time required for positioning may be reduced.

A distance between UT 101a and a target cell 103 may be estimated, where the distance estimation can be based, for example, on fingerprinting (e.g., AECID or Adaptive Enhanced Cell IDentification) maps. With fingerprinting, the network may use pattern matching considering multipath characteristics based on a database of measured and/or predicted signal characteristics (e.g., received signal levels, time delays, etc.) for a specified area covered by the serving cell 103a. A location of UT 101a may be estimated by comparing signals received at serving cell 103a from UT 101a with signal characteristics stored in positioning server 107.

Cell IDs (e.g., physical cell Identifications or PCIs and/or cell global Identifications or CGIs), for example, can be used to identify PRS transmission patterns. Accordingly, Cell IDs can be used to identify interfering PRS signals when the relative subframe shift is known for the involved cells 103.

Cell types and/or corresponding cell power classes (e.g., a micro base station, a pico base station, a home base station such as a home eNodeB in E-UTRAN, a relay, etc.) may be used to sort cells into groups. For example, cells of a preferred cell type(s) may be included in the cell measurement groups, and cells of others cell types may be sorted out. For example, cells of a same layer (e.g., a macro layer including cells 103a to 1031) may be included in a same group.

Radio Access Technologies (RATs) of cells (e.g., GSM, WCDMA, LTE, CDMA2000, etc.) may be used to sort cells into groups. For example, cells of a preferred RAT may be included in the cell measurement groups, and cells of other RATs may be sorted out. For example, cells of a same RAT may be included in a same group.

Frequency carriers of cells may be used to sort cells into groups. For example, cells of a preferred frequency carrier may be included in the cell measurement groups, and cells of other frequency carriers may be sorted out. For example, cells operating at different frequencies may be included in a group (e.g., to account for inter-frequency measurement gaps).

Cells may be sorted according to network operator. For example, cells of a preferred network operator may be included in the cell measurement groups, and cells of other network operators may be sorted out.

Cells may be sorted according to "costs" associated with including a cell in the cell measurement group. For example, there may be a cost associated with some available signals (e.g., signals from beacons) so the positioning target UT 101*a* may decide to not measure PRSs from such cells (which may degrade the accuracy), even if they have been provided in the assistance data, if UT 101*a* can find a sufficient number of other cells.

Cells may be sorted according to cell bandwidth. For example, cells with lower bandwidths may have lower maximum output power compared to cells with greater bandwidths. The lower power level of lower bandwidth cells may affect the reception of the control channels so that lower bandwidth cells may be sorted out.

Cells may be sorted according to numbers of transmit antennas. For example, cells with more transmit antennas (especially for lower power class cells such as pico and home base stations) may have lower maximum output power per antenna port (e.g., 20 dBm with single antenna and 17 dBm per antenna port in case of two antenna ports for home base stations). PRS signals transmitted from one of a plurality of antenna ports of a cell with multiple antennas may be transmitted at lower power than PRS signals transmitted from a cell with only one antenna. Multi-antenna cells (with lower transmit powers) may thus be sorted out.

Cells may be sorted according to a carrier type in the cell. More particularly, if the carrier in a particular cell is one of a plurality of component carriers in a carrier aggregation scenario (also referred to as multi-carrier transmission and reception) the carrier may be transmitted at lower power than if the carrier of the cell is not a component carrier in a carrier aggregation scenario. For example, if a carrier is part of the carrier aggregation then it is probable that the maximum output power per carrier is lower than the typical maximum level. This may especially be the case when there is large number of component carriers in a carrier aggregation scenario. Cells with component carriers in a carrier aggregation scenario may thus be sorted out.

Characterization metrics based on cell identifications are discussed in greater detail below. According to some embodiments, cells with the same IDs PCIs) or within a group of Cell IDs can be treated as "very similar" (e.g., cells with Pas satisfying either mod(PCI,6)=0 or mod(PCI,6)=3) and may be included in one group of interest. For example, when the signal transmission pattern (in frequency-time domain) is the same for a certain group of cell IDs, if a frequency-domain algorithm is used where the PRSs are extracted after the fast Fourier transform (FFT), then only signals along a subset of subcarriers will have to be extracted. For example, PRSs transmitted by different cells on the same carrier at the same time (according to the same or similar PRS patterns) may be grouped together if received signal strengths at UT 101 are similar.

According to other embodiments, cells with different PRS patterns can be in the same group (e.g., when a one-to-one mapping exists between PCI and PRS pattern). With this approach, cells with orthogonal PRS patterns may not suffer from PRS interference. This approach may be particularly useful in interference-limited networks. Furthermore, considering the network planning aspect and depending on the receiver location, cells with different PRS patterns at approximately at a same distance from UT 101 receiver may be more "similar" to each other than cells with the same PRS pattern. For example, PRSs transmitted by different cells on the same carrier at the same time (according to the same or similar PRS patterns) may be included in different groups if received signals strengths at UT 101*a* are significantly different.

According to yet other embodiments, when transmissions in different sets of cells are orthogonal and the sets are defined by PCI (e.g., there are 6 PCI-based PRS patterns orthogonal in frequency), cell grouping based on signal quality may also account for PCIs since they define the sets of interferers (e.g., in equation 2 where then a reference cell is selected per such orthogonal set).

In embodiments discussed above, cell grouping criteria can be classified as: (1) Implementation-specific for the positioning target UT 101*a* (e.g., SINR calculation at UT 101*a*); (2) explicitly signaled from the network to the positioning target UT 101*a* (e.g., PCIs); and/or (3) pre-defined and known to the network and the positioning target UT 101*a* (the required cell order in the list). If not explicitly stated, characterization metrics described herein can be used for cell sorting/grouping at the network side and/or the positioning target UT 101 side. In other embodiments of the present invention, multi-level cell grouping may be provided following the same cell grouping principles, but distinguishing the cell groups by some metric, e.g., cell groups distinguished by RAT and/or frequency.

Methods for building up cell groups are discussed in greater detail below, and the methods may be applicable for both synchronous and asynchronous networks. Moreover, the following scenarios for cell grouping may be distinguished: scenario 1 where all cells are always transmitting; and scenario 2 where at least some cells do not transmit at some times.

In scenario 1, cell grouping may address complexity issues in measurement processes and/or measurement processing efforts (e.g., computational resources, power and time), memory limitations, measurement report size limitations, etc. In the scenario 2, the task may be more complex in general due to additional constraints imposed by limited (in time) availability of signals in certain cells, which can be, for example, due to specific transmission patterns and/or measurement capability (e.g., inter-frequency measurements may be possible only during measurement gaps).

In each of these two scenarios, at least two cases can be further considered: (a) a fixed number of cells in each group; and (b) a constrained (but not fixed) number of cells per group while a maximum difference A of the characterization metric with each group may be minimized/reduced (i.e., the cells within a group may be as "similar" as possible).

In scenario 1(a), given N cells and M time intervals (e.g., number of positioning occasions where each occasion contains K consecutive downlink sub-frames with PRS), a minimum number L of time intervals to measure one cell (e.g., compatible with RSTD measurement requirements of 3GPP TS 36.133 or some measurement period estimated by UT 101*a* based on the environment type and the requested positioning quality), the relation between these parameters and the average number n of cells per group is as follows:

$$(N/M)*L=n.$$

Figure 5:
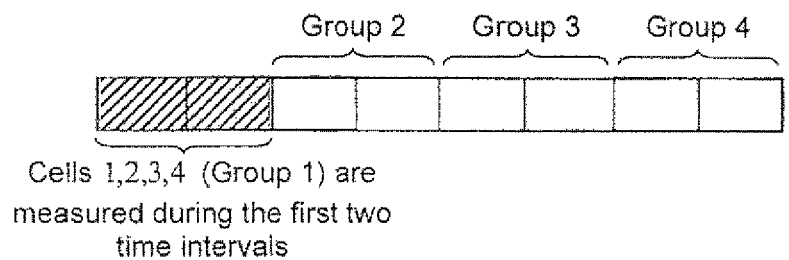
FIGS. 5 and 6 are diagrams illustrating cell groupings by time interval according to some embodiments of the present invention.

The combination of parameters N=16, M=8, L=2 gives 4 groups of n=4 cells per group as shown in FIG. 5 for an example of scenario 1(a).

In scenario 1(b), a mathematical problem can be formulated as minimizing/reducing a maximum metric difference $\Delta$ among the groups. In practice, one can exploit the fact that ideally in the sorted sequence the optimal (minimum/reduced) difference in the metric within groups is:

$$\Delta = \frac{q_N - q_1}{N_{gr}},$$

where $N_{gr}$ is the number of groups (e.g., $N_{gr}=M/L$), and the groups are formed as follows:
 group 1 comprises the set of cells $\{i=1, \ldots, n^{(1)}: q_i - q_1 \leq \Delta\}$,
 group 2 comprises the set of cells $\{i=n^{(1)}+1, \ldots, n^{(1)}+n^{(2)}: q_i - q_{n^{(1)}+1} \leq \Delta\}$, etc.

With a constrained (given maximum) number of cells per group, the group sizes may have to be adjusted accordingly, which may also degrade an optimal $\Delta$ found above due to the additional constraint. Accordingly, a straightforward approximation algorithm for cell grouping in Scenario 1(b) may include: (1) creating a cell grouping as described above, without group size adjustment; and (2) starting from the first group, rearranging the cell groups if necessary to meet the constraint on the maximum number of cells per group.

Figure 6:
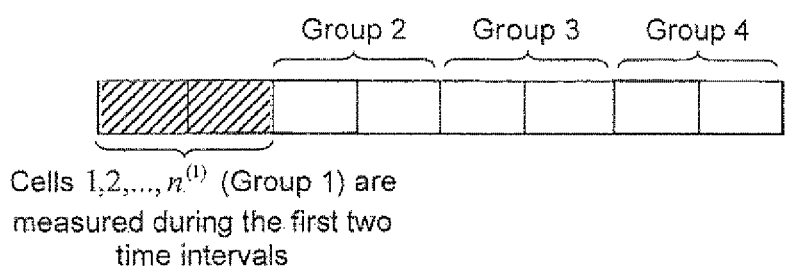
Figure 7:
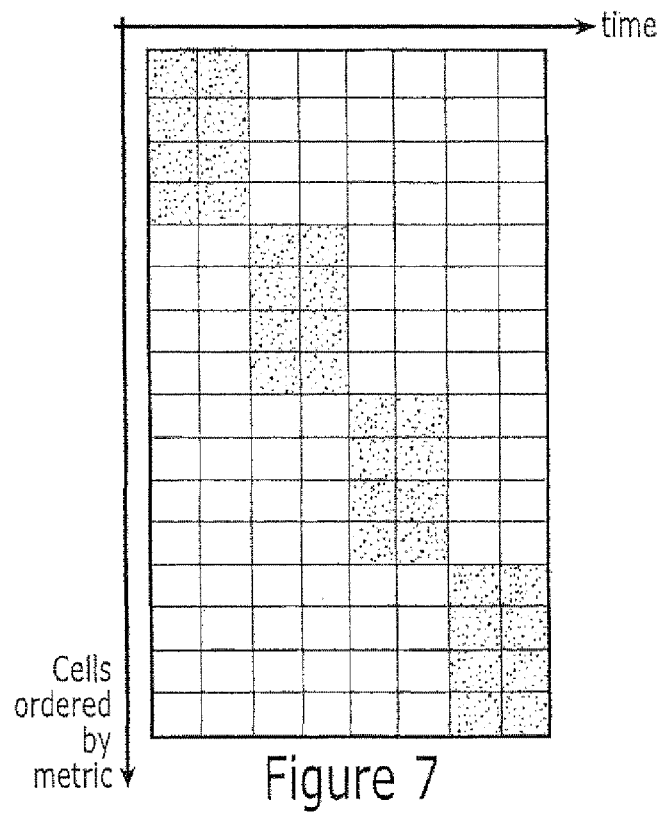
FIGS. 7 and 8 are diagrams illustrating cell groupings by time and metric according to some embodiments of the present invention.
Figure 8:
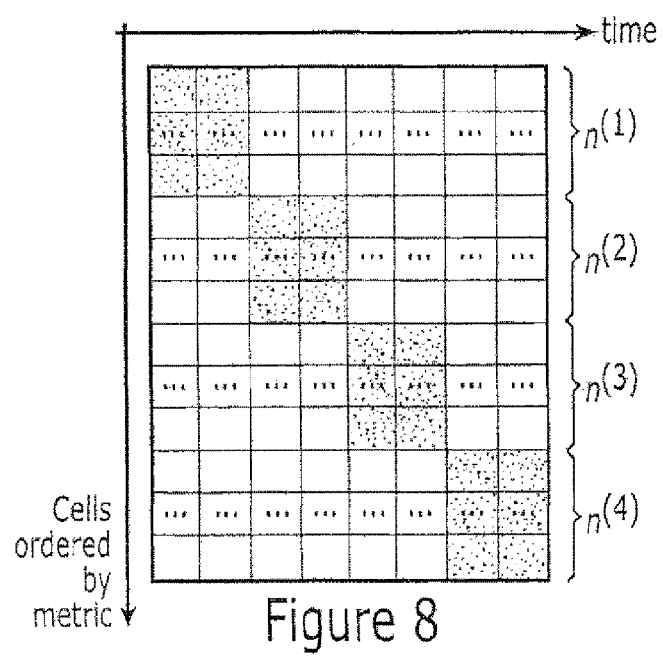

With the described algorithm for Scenario 1(b), the combination of parameters N=16, M=8, L=2 gives 4 groups and the cell grouping as shown in FIG. 6. Solutions to the Scenarios 1(a) and 1(b) can be schematically represented as respectively shown in FIGS. 7 and 8.

Figure 9:
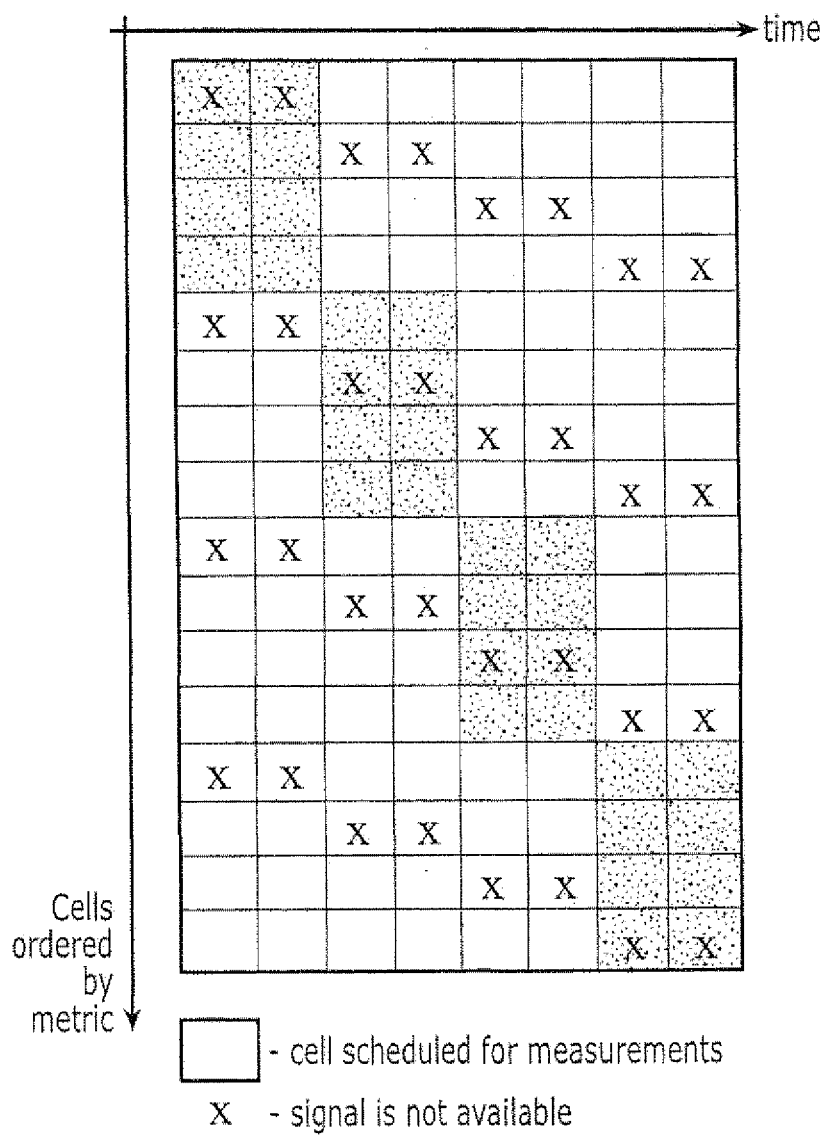
FIG. 9 is a diagram illustrating cell groupings by time and metric and showing unavailability periods according to some embodiments of the present invention.

In Scenarios 1(a) and 1(b), the assumption has been that the transmitted signals from different cells are always available (e.g., that there is no PRS muting). In Scenarios 2(a) and 2(b), the signal availability may be limited at least in some cells, potentially complicating the problem. These scenarios, however, may be very realistic in practice (e.g., when muting is used for positioning purposes and/or when low-interference subframes are configured in heterogeneous networks). FIG. 9 shows that schemes derived for Scenarios 1(a) and 1(b) may be not applicable for Scenarios 2(a) and 2(b). The example of FIG. 9 shows the importance of taking the signal availability periods into account when scheduling cell measurements according to some embodiments of the invention. To account for the signal availability, some embodiments of the present invention may exploit cell sorting and iterative application of permutations in the closest groups, starting, for example, from a cell grouping designed for Scenario 1(a). As shown in FIG. 9, some cells may never be measured in the example of Scenario 1(a) if cells are scheduled for measurement during their unavailability periods.

Figure 11:
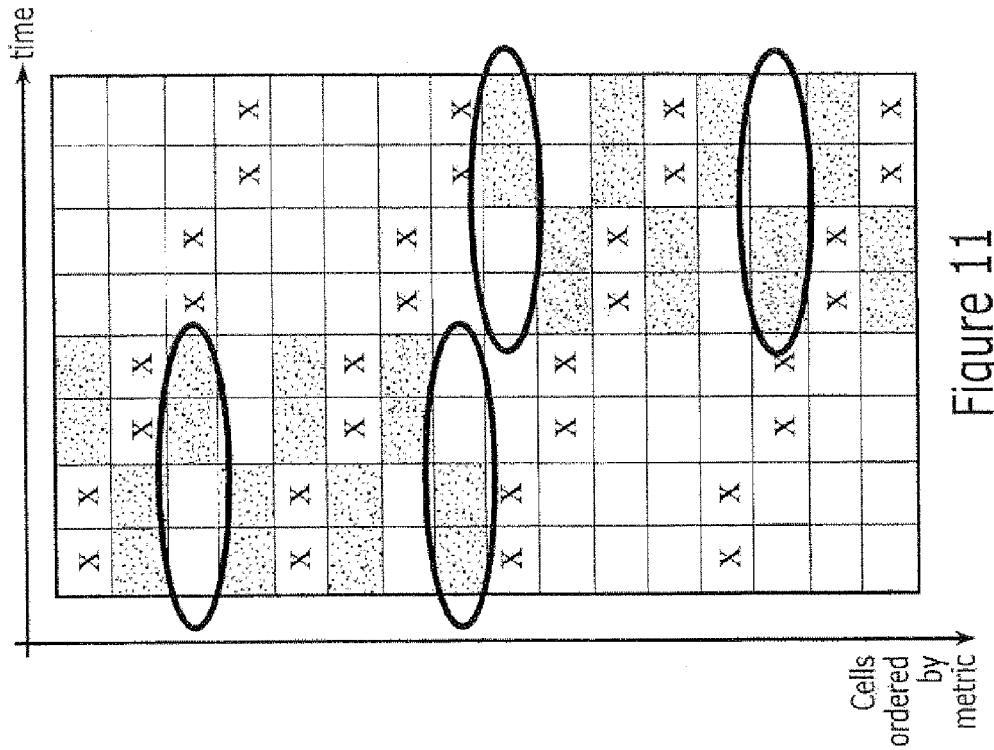
FIGS. 10 and 11 are diagrams illustrating cell groupings by time and metric with cell re-grouping to account for signal unavailability according to some embodiments of the present invention.
Figure 10:
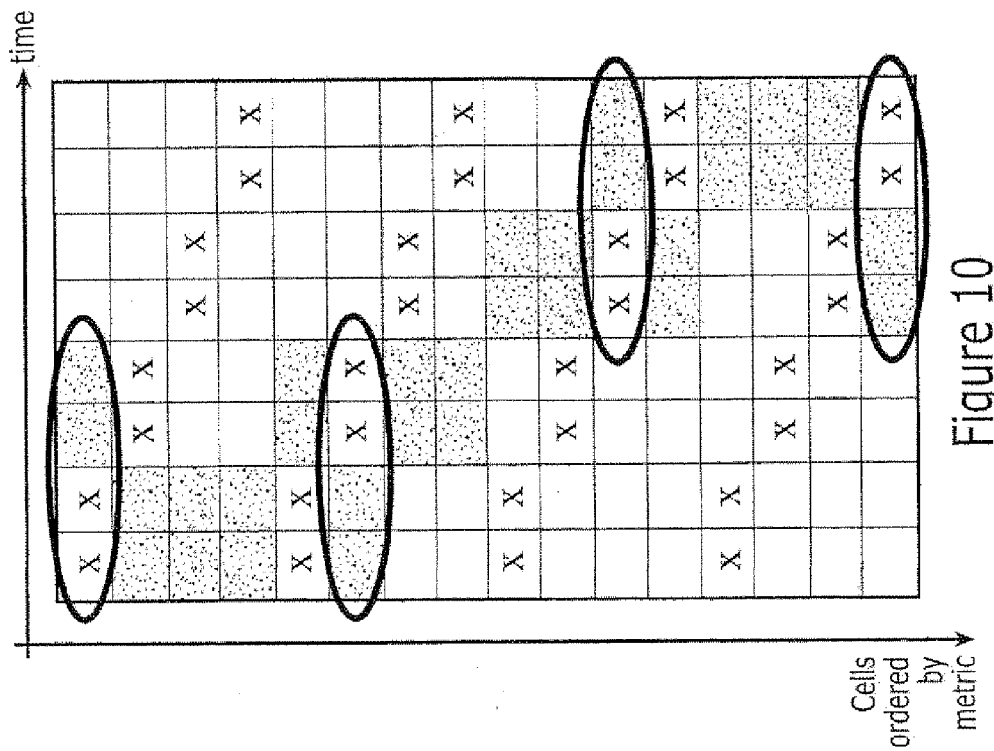

For the underlying assumption of Scenario 2(a) where the number of cells per group is given, the permutation is one-to-one, i.e., one cell is reassigned from group x to group (x+1), or the group which spans cells closest in the metric to group x, but another cell is reassigned from group (x+1) to group x as shown in FIG. 10. In FIG. 10, cell regrouping is provided to account for signal unavailability, with the changes (relative to FIGS. 7 and 9) indicated by ovals. As a result, the lower-bound and the upper-bound metric values in the affected groups may change thus degrading the "similarity" property within at least one group (e.g., the $2^{nd}$ group in FIG. 10). Degradation of the "similarity" property may be reduced by reassigning the cells with the highest metric value within the group (i.e., the cells setting the upper-bound metric value of the group) to a group with a higher lower-bound metric value, and the other way around, so that a maximum difference in the metric over the two groups decreases. With a fixed number of cells per group, the reassignment may be compensated by a reassignment in the opposite direction as shown in FIG. 11, with changes relative to FIG. 10 indicated with ovals. This operation may thus include: (1) cell re-grouping to account for signal availability; and (2) further cell re-grouping to optimize/improve the "similarity" property over the groups with a compensation re-grouping to provide the fixed number of cells per group.

Figure 12:
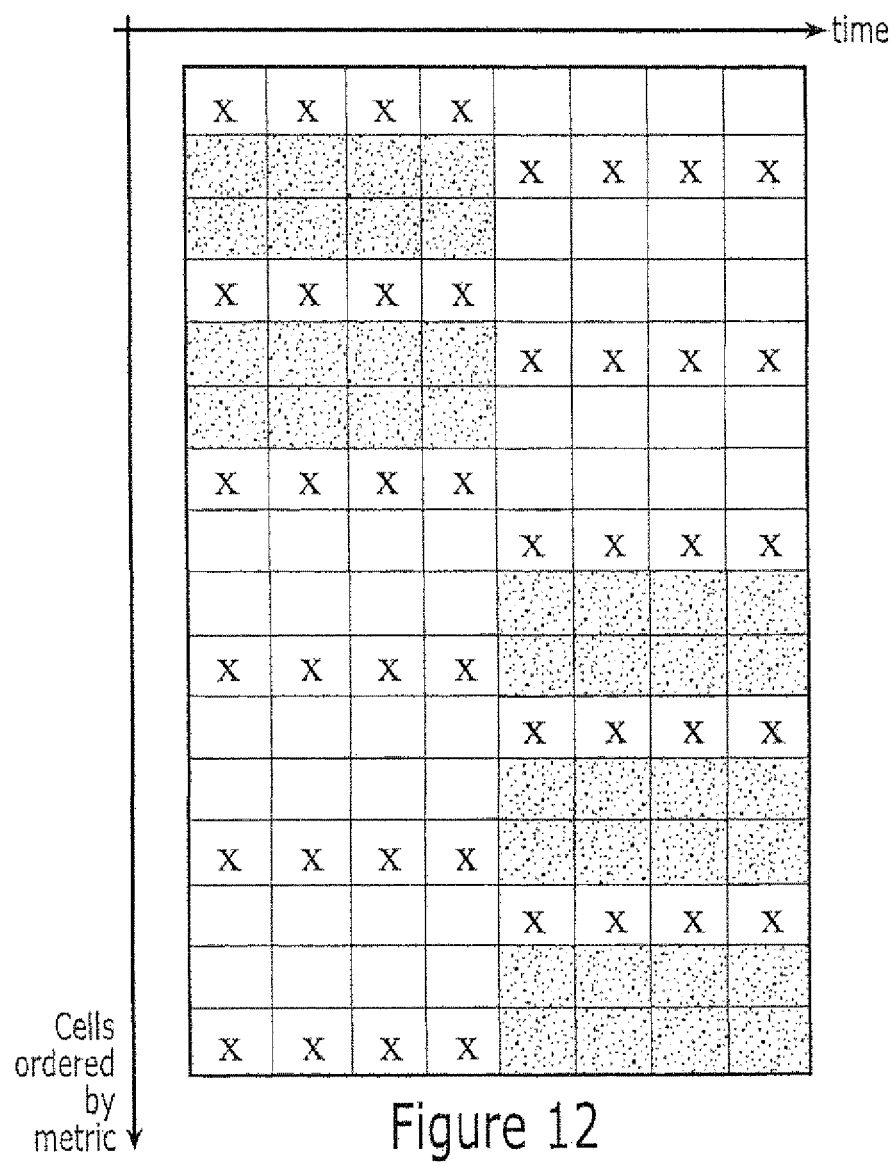
FIG. 12 is a diagram illustrating cell re-grouping with muting periods during 50% of time in some cells and no muting in other cells, and unequal group sizes according to some embodiments of the present invention.

In contrast to scenario 2(a), the number of cells in each group in scenario 2(b) is not fixed to be the same among different groups of cells, but the number of cells in each group may be constrained to a certain maximum number. The "similarity" property of the groups may still be optimized/improved over the groups. For scenario 2(b), operation 1 of scenario 2(a) (cell re-grouping to account for signal availability) may apply to avoid scheduling measurements for cells when the signals of interest in these cells are not transmitted (i.e., not available for measurements). Optimization/improvement of operation 2 of scenario 2(a) may also be used; but the compensation re-grouping providing a given number of cells per group is not necessary in Scenario 2(b) although a maximum number of cells per group may be established such that the maximum number of cells per group shall not be exceeded. FIG. 12 illustrates a schematic re-grouping example for Scenario 2(b).

Cell grouping with a sorted neighbor cell list is discussed by way of example. A neighbor list, which is sorted by the network according to some criteria (e.g., geometry factor or signal strength, as discussed above), may be received by the target UT 101 receiver 115. The target UT 101 receiver 115 may rearrange the cells for measurements according to its own criterion/criteria, involving the expected RSTD and accounting for PRS muting configuration, and the target UT 101a may report the measurements back to the network (e.g., back to positioning server 107 through serving cell 103a, network node 104a, and core network 105), in the restored original cell order if the latter is required.

In some embodiments, the network (e.g., positioning server 107) may provide the positioning target UT 101a with assistance data, including the neighbor cell list, and the cells in the neighbor cell list may be expected to be ordered according to some cell quality (based on network knowledge). The positioning target UT 101a may be expected to report in the same order, even though the positioning target UT 101a may have a better knowledge about the cells to be measured and including knowledge that some cells may not provide good measurements (e.g., signals from some cells may be too weak) according to UT 101a knowledge.

UT 101a can rearrange the cells for measurements. To preserve the order of cells (if it is necessary/desired) when reporting the measurements to the network, however, the positioning target UT 101a may maintain relative cell positions/order in measurements returned to the network, but UT 101a may still be able to exclude those "bad" cells or provide empty reports for such cells rather than spending measurement resources to obtain measurements (which are expected to have poor-quality) for such cells. For example, the positioning target UT 101a may sort the cells identified in the neighbor cell list by the expected RSTD (the rearrangement may apply to all cells in the received list or a certain number of X1 first cells from the received list) and measure/report X2 first cells.

In other embodiments, the positioning target UT 101a may report measurements for cells in the same order as the cells have been measured. The positioning target UT 101a may rearrange the cells accounting for the muting/signal availability. If the order of cells provided by the network does not take into account muting or applies for a specific reference time point; the rearrangement can be different in time periods with a different muting configuration for at least one cell (see the conditional metric description discussed above).

Methods may also be provided to acquire information about signal availability for measurements. The described Scenarios 2(a) and 2(b) assume that the signal of interest may not be available (i.e., not transmitted or muted, such as PRS muting in E-UTRAN) in at least some cells at some times. Knowledge/estimation/prediction of signal availability/unavailability may thus be used at the target positioning UT 101a receiver 115 for cell grouping. This information can be obtained at the positioning target UT 101a, for example, from one or more of the following: known transmit time-frequency patterns (e.g., pre-defined and/or standardized, signaled, computed and/or stored, etc.); muting configurations signaled from the network to the positioning target UT 101a (e.g., as signaled over LPP [3GPP TS 36.355] and positioning configuration [3GPP TS 36.211]); low-interference subframe configuration (e.g., in heterogeneous networks, whereby transmission in one or more sub-frames is partly or fully blanked) which could be signaled or predicted/mapped, for example, from a cell ID; configured inter-frequency measurement gaps; and/or TDD sub-frame configurations (e.g., TDD UL-DL sub-frame configurations and TDD special sub-frame configurations [3GPP TS 36.211]).

The availability/unavailability configuration can be characterized, for example, by: availability/unavailability of bandwidth; availability/unavailability of time intervals (e.g., when a particular configuration is valid); availability/unavailability of periodicity; and/or availability/unavailability of configuration for reference time point (e.g., when specified by a pattern).

Although the illustrations of FIGS. 4 to 12 are useful for a general description of embodiments of the present invention, the illustrated schemes may be represented in a matrix form with the characterization metric as its values where rows and columns correspond to cells and time periods, respectively. The metric may be non-uniformly increasing by cell in the ordered list of cells, so it is not only the order of rows that matters but also the metric incremental change (the metric difference for two cells in the ordered list) when deciding grouping/re-grouping. Furthermore, if the characterization metric is time-dependent, the order of cells may be defined by the values of the matrix elements rather than by the order of cells.

According to some embodiments of the present invention, methods may be provided to acquire information to build cell groups. The information related to parameters and characterization metrics used to build cell groups can be acquired, for example, as discussed below. The following are provided as examples of approaches that can be used to obtain information that can be used to create cell groups.

Information may be extracted and/or deduced from positioning assistance data signals transmitted from the network (e.g., global and/or local cell identities, timing and/or distance related information such as expected RSTD and/or RSTD uncertainty, muting configurations, positioning configurations including positioning occasion configuration and periodicity, etc.). Information may be obtained using blind detection (e.g., cell IDs, positioning pattern configurations, muting configurations, etc.) and deduced from the blindly discovered information (e.g., PRS pattern mapping from cell IDs). Information may be deduced from quality-related information (e.g., positioning requirements in [3GPP TS 36.133], the minimum number of positioning occasions to be measured for each cell to achieve a certain positioning Quality of Service (QoS) requirement, etc.). Information may be extracted and/or deduced from signaled or blindly discovered information not directly related to positioning (e.g., network TA, low-interference subframe information such as subframes configured with reduced transmission activity to efficiently operate heterogeneous networks, etc.). Information may be obtained using historical data (e.g., stored historical cell grouping information, some other historical positioning-related information which can be, for example, the muting information, other-purpose historical data which can be, for example, SON (Self Organizing Network) measurements, measurements to minimize/reduce drive tests or cell grouping information for mobility measurements, etc.).

According to some embodiments of the present invention, cell grouping may be provided for inter-frequency and inter-RAT applications. Due to, for example, limited measurement capability at UT 101a receiver 115, inter-frequency and inter-RAT measurements may induce addition constraints on signal availability for measurements (e.g., UT 101a may be able to measure only during inter-frequency measurement gaps). In general, however, the same principles as described above regarding the similarity principle and characterization metrics may also apply to cell grouping used to perform inter-frequency and inter-RAT positioning measurements, which include all possible inter-frequency and inter-RAT scenarios when applicable (e.g., inter-frequency TDD-TDD, FDD-FDD, FDD-TDD and TDD-FDD). In other embodiments, multi-level grouping may be considered (e.g., cell groups distinguished by RAT and/or frequency), which may be especially relevant when the measurements are to be conducted within measurement gaps defined per frequency.

According to some embodiments of the present invention, cell grouping may be provided for carrier aggregation and/or multi-carrier systems. According to some embodiments, the same cell group principles as discussed above may also apply to all cells (to be measured) belonging to the component carriers in a carrier aggregation/multi-carrier scenario. In this case, all cells across different carriers may be considered as one global set of cells for cell grouping. In an alternative, the cell grouping may still be done using principles discussed above, but on a per component carrier (CC) basis in the multi-carrier scenario. This can be justified, for example, by such factors as the interference situation, and the set of interferers may be different on a different CC (component carrier) and/or measurements may be allowed only within certain measurement gaps. Furthermore, any of the above two alternatives (global set or per CC basis) may be applied only to the component carriers, which are at least configured by the higher layer. In an alternative, the above alternatives may apply to CCs, which are both configured (e.g. by higher layers such as RRC or Radio Resource Control) and activated (e.g., by lower layers such as Li or MAC (Medium Access Control)).

According to some embodiments of the present invention, complementary usage of cell grouping information may be provided. An objective of cell grouping as discussed above may be to optimize/improve positioning measurement processes, procedures, etc. In addition, the cell grouping information may also be used by the positioning target UT 101a and/or the network for other purposes as discussed below.

At UT 101a, the cell grouping information may be stored and maintained in a database in memory 120 for reuse at a later stage or in similar conditions as before. The information may be used unchanged, provided that the later assistance data is either unchanged or contains relatively insignificant changes relative to the assistance data from which the original cell grouping information was obtained. More particularly, information from the database may be used to build-up/re-build/re-optimize the cell grouping information for other positioning requests for the same positioning target UT 101s. The cell grouping information may be maintained in memory 120 for a set period of time and/or until UT 101a detects sufficient movement. Once the set time period has passed (i.e., the cell grouping information times out) and/or UT 101a detects sufficient movement, the cell grouping information may be deleted from memory 120, for example, because the cell grouping information may be deemed to be insufficiently relevant.

At UT 101a, cell grouping information may be exchanged with other mobile devices (e.g., UT 101b) within a relatively short range (e.g., connected to the other mobile device via a short range wireless coupling such as Bluetooth), or via device to device communication in a relay network. The exchange of information can be used by the other positioning target UT 101b (in relatively close proximity to the original UT 101a for which the cell grouping information was generated) to reuse the cell grouping information (generated for the original UT 101a) partially or fully to group cells for positioning measurements. Time and/or processing for positioning may be reduced at UT 101b by reusing the cell grouping information, and physical proximity (due to the short range wireless coupling used to facilitate the sharing) of the two UTs 101a and 101b may allow the same cell grouping information to be relevant for both UTs.

The cell grouping information may be used for other positioning methods (e.g., AECID (Adaptive Enhanced Cell IDentification)) and/or other non-positioning purposes (e.g., mobility measurements or tracking area updates). For example, when a neighbor cell list for mobility is not provided by the network (an optional feature in LTE) to UT 101a, UT 101a may use X first cells from the positioning neighbor cell list for mobility measurements, for example, if the positioning neighbor list is sorted by signal strength and/or signal quality.

The cell grouping information may be used to organize measurement reporting from the positioning target UT 101a to the network. For example, an order of reporting positioning measurements may be defined by an order of cell identities provided by positioning server 107 in the assistance data transmitted to UT 101a. More particularly, positioning measurements for cells within one group may be reported to the network together in one measurement report, and positioning measurements for cells of different groups may be reported to the network in different measurement reports, thereby allowing the network to allocate communications resources (e.g., carriers and times) for transmission of positioning measurements from UT 101a to the network before the measurements have been made.

Cell grouping information may be used at the network side, for example, to optimize/improve measurement report scheduling which may impact scheduling grants allocated for each specific UT. The network can expect position measurement reports transmitted from the positioning target UT 101a with each measurement report including positioning measurements for all cells of one group. Accordingly, one measurement report may be provided for each cell group.

The measurement reports may be signaled over PUSCH (Physical Uplink Shared Channel) according to E-UTRA (Evolved Universal Terrestrial Radio Access). The PUSCH resources may therefore be assigned to UT 101a by serving cell 103a (eNodeB) in the form of scheduling grants. As an example, four measurement reports may be used to report position measurements for 16 cells assuming each cell group includes 4 cells. Resources for measurement reporting may be allocated accordingly (e.g., to reduce latency of positioning measurement reports). Furthermore, the allocated resources may be used more efficiently. An eNodeB cell, for example, may not need to allocate separate resources for each positioning measurement result corresponding to each cell measurement.

Because the scheduling grants may be issued by an eNodeB network node 104a and/or serving cell 103a via RRC (Radio Resource Control), it is assumed that the cell grouping information and/or the requested reporting configuration may be made available at the eNodeB cell (e.g., from the O&M or the positioning node). In an alternative, the report periodicity for positioning measurements may be configured via LPPa (LPP Annex) by positioning server 107.

Alternatively, eNodeB network node 104a and/or serving cell 103a may autonomously deduce some grouping principles that are likely to be used by positioning target UT 101a (e.g., based on known muting configurations of cells such as the reference times of muting patterns, lengths of muting intervals, periodicities, etc.). These principles and/or the resulting grant allocation strategy (e.g., reporting periodicity) may be UT-specific, UT-group specific, area-specific, cell-specific, etc. For example, eNodeB network node 104a and/or serving cell 103a may allocate only a subset of resources (e.g., for four cells assuming 16 cells are to be measured in total) at a time rather than all resources in the beginning (i.e., at the time of requesting the measurements). In E-UTRAN (Evolved Universal Terrestrial Radio Access Network), depending on factors such as positioning occasion periodicity (i.e., the occasion when PRS is available), the positioning measurement reporting delay can be on the order of several seconds. Accordingly, allocation of the uplink resources (e.g., PUSCH in LTE) by eNodeB network node 104a and/or serving cell 103a just prior to the measurement reports may prevent/reduce waste of resources.

The network may use cell grouping information to perform and/or improve network planning. For example, the network may request that UT 101a report statistics about cell grouping. In an alternative, the network may identify the cell grouping used in UT 101a reported measurements based on the reported positioning measurements. The signaling of the cell grouping information may be specified from target positioning UT 101 to the network for testing purposes and/or to minimize/reduce driving tests.

According to some embodiments of the present invention, improved positioning measurement may be provided at the positioning target UT 101a, and/or cell sorting principles may be developed for positioning assistance data. Improved positioning measurement may be provided by virtue of efficient cell grouping at the positioning target UT 101a, for example, when the transmit power in some cells (such as in heterogeneous network) is different. Methods of using positioning cell grouping information at the network may, for example, provide improved scheduling resource allocation and/or reduced latency for positioning measurement reports, enhanced network planning/testing, etc.

According to embodiments of the present invention, a similarity principle and/or characterizations metrics may be used to provide, cell groupings used for UT positioning. For example, methods may be provided to build up cell groups, to sort cells in position assistance data, to acquire cell grouping information used to build cell groups, to use cell grouping information to build cell groups, to use cell grouping information to schedule positioning measurement reports, and/or to sort and/or reuse cell grouping information at positioning target UT 101*a*.

FIGS. 13 and 14 are flow charts respectively illustrating operations of positioning target UT 101*a* and radio communications network according to some embodiments of the present invention. Positioning server 107 of the radio communications network may generate assistance data including an ordered list of cell identities for cells 103 that transmit reference signals used for positioning measurements at block 1401. The cell identities may be ordered according to a plurality of groups of cells 103 to be used for position measurements at positioning target UT 101*a*, and the plurality of groups may include first, second, third, etc. groups defined according to a characteristic of the reference signals transmitted by the respective cells 103 and/or of the respective cells 103 that transmit the reference signals. By way of example, a first group of cells 103 may be organized as a group of l cells 103 corresponding to a sequence of identities in the ordered list (where l is an integer), a second group of cells 103 may be organized as a group of in cells 103 corresponding to a sequence of in cell identities in the ordered list (where m is an integer), a third group of cells 103 may be organized as a group of n cells 103 corresponding to a sequence of n cell identities in the ordered list (where n is an integer), etc. At block 1403, the assistance data (including the ordered list of cell identities) may be transmitted from positioning server 107 through core network 105, serving network node 104*a*, and serving cell 103*a* to the positioning target UT 101*a*.

According to some embodiments of the present invention, the characteristic (used to define the groups of cells and/or cell identities) may account for reference signal availability. For example, the reference signals transmitted by the respective cells 103 of the first group may be transmitted during a first positioning occasion, the reference signals transmitted by the respective cells of the second group may be transmitted during a second positioning occasion, the reference signals transmitted by the respective cells of the third group may be transmitted during a third positioning occasions, etc. (where the first, second, third, etc. positioning occasions occur during different non-overlapping time intervals).

According to some embodiments of the present invention, the characteristic (used to define the groups of cells and/or cell identities) may be based on at least one of cell 103 maximum transmit power, cell 103 bandwidth, reference signal transmit bandwidth, cell 103 transmitter 133 location, estimated distance between positioning target UT and cell 103 transmitter, cell 103 transmitter geographical geometry, cell 103 type, timing of cell 103 transmissions of reference signals to be used for positioning measurements, signal quality, received signal strength, expected reference signal time difference, cell 103 radio access technology, cell 103 frequency, cell 103 carrier status, cell 103 operator, number of cell 103 transmit antennas, carrier frequency, cell 103 carrier type, service cost, reference signal muting information, cell identity, and/or reference signal pattern. According to some embodiments of the present invention, the characteristic (used to define the groups of cells and/or cell identities) may be based on a metric such that values of the metric for the cells 103 of a first group are on a first side of a threshold for the metric and such that values of the metric for the cells 103 of the second group are on a second side of the threshold for the metric.

According to some embodiments of the present invention, the plurality of groups of cells may be defined by selecting a subset of the plurality of cells 103 according to a first characteristic, and eliminating other cells that do not satisfy that first characteristic. For example, cells that are too distant from positioning target UT 101*a*, cells whose transmissions are not received at positioning target UT 101*a* with sufficient strength/power, etc. may be omitted from cell groups used for positioning measurements at positioning target UT 101*a*. Cells 103 from the subset may then be assigned to the plurality of groups according to a second characteristic so that the cells 103 of a first group are similar with respect to the second characteristic, so that the cells 103 of a second group are similar with respect to the second characteristic, and so that the cells 103 of the first and second groups are different with respect to the second characteristic. For example, cells of the first group may transmit positioning reference signals during a first positioning occasions, and cells of the second group may transmit positioning reference signals during second positioning occasions different than the first positioning occasions.

At block 1301 of FIG. 13, the assistance data (including the ordered list of cell identities) may be received at receiver 115 and processor 111 of positioning target UT 101*a*. At block 1303, the ordered list of cell identities may be used by processor 111 of positioning target UT 101*a* to define a plurality of groups of cells 103 from the cells 103 that transmit reference signals for positioning measurements. More particularly, the plurality of groups of cells may be defined according to a characteristic of the reference signals transmitted by the respective cells 103 and/or of the respective cells 103 that transmit the reference signals as discussed in greater detail above. As noted above, processor 111 may define the groups according to an order of cell identities included in the assistance data provided by positioning server 107. According to other embodiments of the present invention, processor 111 may define the groups of cells using another technique (e.g., using information received directly from the different cells) so that positioning server 107 does not define the cell groups.

At blocks 1305, 1307, and 1309, positioning target UT 101*a* may select a group of cells 103, receive positioning reference signals from the cells 103 of the selected group, and perform positioning measurements using the positioning reference signals from the cells 103 of the selected group. If all cells of a group transmit positioning reference signals during a same positioning occasion, a time required to receive reference signals and perform positioning measurements for the cells of a group may be reduced. While operations of blocks 1305, 1307, and 1309 are shown in series, one or more of these operations may be performed in parallel.

After performing positioning measurements at block 1309, processor 111 may determine at block 1311 if there is another group of cells for which positioning measurements have not been performed. If there is another group of cells for which positioning measurements have not been performed, operations of blocks 1305, 1307, and 1309 may be repeated for the next group of cells, and the operations of blocks 1305, 1307, and 1309 may be repeated for each group. By grouping cells for positioning measurements according to a characteristic as discussed above, operations of blocks 1305, 1307, and 1309 may be iteratively performed for cells 103 of a group that transmit positioning reference signals having similar characteristics. If cells are grouped so that cells in a group transmit positioning reference signals during a same positioning occasion, for example, each iteration of blocks 1305, 1307, and 1309 may be performed during one positioning occasion.

Once positioning measurements have been performed for all of the groups, the positioning measurements may be used by processor 111 to determine position information for the positioning target UT 101*a* at block 1315. Processor 111, for example, may use the positioning measurements to determine/estimate a location of positioning target UT 101a. According to other embodiments, processor 111 may use the positioning measurements to generate an initial estimate its location, and the initial estimate may be used to more efficiently obtain a precise GPS location. According to other embodiments, the positioning measurements may be transmitted (through UT 101a transmitter 113, serving cell 103a, serving network node 104a, and core network 105) to positioning server 107, and positioning server 107 may use the positioning measurements to determine/estimate a location of positioning target UT 101a.

FIGS. 15 and 16 are flow charts respectively illustrating operations of UT 101a and radio communications network according to some embodiments of the present invention. As shown in FIG. 16, positioning server 107 may generate assistance data including an ordered list of cell identities at block 1601, and positioning server 107 may transmit the assistance data to positioning target UT 101a at block 1603. At block 1501, positioning target UT 101a may receive the assistance data. Operations of blocks 1601, 1603, and 1501 may be performed as discussed above with respect to blocks 1401 and 1403 of FIG. 14 and block 1301 of FIG. 13.

In addition, serving network node 104a may allocate resources to be used by positioning target UT 101a to report positioning measurements at block 1604. For example, serving network node 104a may allocate time intervals and carriers to be used by positioning target UT 101a to transmit subsequently obtained positioning measurements corresponding to the positioning reference signals transmitted by the cells of the respective groups. More particularly, different time intervals may be allocated for positioning target UT 101a to transmit positioning measurements for the respective groups. The resource allocations may be transmitted separately from or together with the assistance data. Moreover, resource allocations for all the groups may be transmitted to UT 101a at one time, or resource allocations for different groups may be transmitted at different times. By allocating resources to report positioning measurements before performing positioning measurements, communications resources may be used for efficiently. At block 1502, the resource allocations may be received at positioning target UT 101a together with and/or separately from the assistance data.

Processor 111 of UT 101a may define the groups of cells as discussed above with respect to block 1303 of FIG. 13. At blocks 1505, 1507, and 1509, positioning target UT 101a may select a group of cells, receive positioning reference signals from the cells of the selected group, and perform positioning measurements for the cells of the selected group as discussed above with respect to blocks 1305, 1307, and 1309 of FIG. 13. At blocks 1511 and 1605, positioning measurements for the selected group are transmitted from processor 111 of positioning target UT 101a (through transmitter 113, antenna 117, serving cell 103a, serving network node 104a, and core network 105) and received at positioning server 107 of radio communications network. More particularly, the positioning measurements for the selected group may be transmitted from UT 101a and received at serving cell 103a of radio communications network during the time interval allocated by positioning server 107 for that group.

After performing positioning measurements at block 1509, processor 111 may determine if another group of cells 103 remains for positioning measurements to be performed at block 1515. Accordingly, operations of blocks 1505, 1507, 1509, 1511, and 1605 may be repeated for the each group of cells. Having received the positioning measurements at positioning server 107, positioning server 107 may determine location information for positioning target UT 101a using the received positioning measurements at block 1607. Positioning server 107, for example, may determine/estimate a location of positioning target UT 101a using only the positioning measurements, and/or positioning server 107 may determine/estimate a location of positioning target UT 101a using the positioning measurements together with GPS measurements also provided by positioning target 101a.

By reporting the positioning measurements from positioning target UT 101a to location server 107 in an order defined by the order of cell identifications provided in the assistance data of block 1601, positioning server 107 can determine a correspondence of positioning measurements and cells without requiring further information from UT 101a. Accordingly, communications resources may be conserved. UT 101a, for example, may report/transmit positioning measurements for each group during the respective time intervals that were previously allocated by positioning server 107 at block 1604. Moreover, the ordering of groups and time intervals, and the ordering of cell positioning measurements within each group may be defined by positioning server 107 as part of the resource allocation of block 1604.

According to some embodiments of the present invention, positioning target UT 101a may choose not to measure a positioning reference signal from a cell or cells identified by positioning server (e.g., because a signal quality/strength from that cell is not sufficient), or an attempted measurement may provide an unsatisfactory result. In either ease, processor 111 may transmit a null report for the omitted or unsatisfactory measurement to maintain the order of measurements defined by positioning server 107.

At blocks 1609 and 1517, positioning server 107 may transmit the determined/estimated location (through core network 105, serving network node 104a, and serving cell 103a) to positioning target UT 101a. If the determined/estimated location is based only on the positioning measurements, processor 111 may use the determined/estimated location together with GPS signals received at UT 101a to provide a more accurate location of UT 101a, and the more accurate GPS based location may be transmitted back to positioning server 107.

As discussed above, cell groups may be defined by positioning server 107 and transmitted to positioning target UT 101a with the assistance data. According to other embodiments of the present invention, processor 111 of positioning target UT 101a may group the cells according to one or more characteristics based on information received directly from cells 103. Processor III, for example, may group cells based on information provided by control signals transmitted by cells 103, based on a strength/quality of signals received from cells 103, etc.

According to additional embodiments of the present invention, positioning server 107 may generate assistance data including an ordered list of cell identities for cells 103 that transmit reference signals used for positioning measurements. More particularly, the cell identities may be ordered according to estimated received signal strengths of the reference signals at an estimated location of positioning target UT 101a. The assistance data (including the ordered list of cell identities) may be transmitted (through core network 105, network node 104a, and/or cell 103a) to positioning target UT 101a. Positioning server 107, for example, may estimate a location of positioning target UT 101a using signals received from UT 101a at different cells 103, using measurements of signals received at UT 101a from different cells 103, and/or using measurements of signals received at UT 101a from different satellites. Accordingly, the assistance data (e.g., an OTDOA-NeighborCellInfoList) may be sorted according to the best estimated received signal strength at an a-priori location estimate of the positioning target UT 101a.

Positioning target UT 101a may then define an order of cells (103) from a plurality of cells (103) according to the order of cell identities received in the list from the radio communications network. Accordingly, the order of cells may be defined at positioning target UT 101a according to estimated received signal strengths of the reference signals at the estimated location of a positioning target device. Positioning target UT 101a may then measure the reference signals used for positioning measurements from the cells (103) at the positioning target device (101). Respective available positioning measurements may then be reported from positioning target device 101a to positioning server 107 (through cell 103a, network node 104a, and/or core network 105) of the radio communications network in an order corresponding to the order defined by the list received from positioning server 107 of the radio communications network. Positioning server 107 may thus receive positioning measurements from positioning target device 101a in an order corresponding to the order defined by the ordered list of cell identities. Stated in other words, positioning target device 101a may be expected to provide available measurements in a same order as set forth in the assistance data provided by positioning server 107.

Many variations and modifications can be made to the embodiments without substantially departing from the principles of the present invention. All such variations and modifications are intended to be included herein within the scope of the present invention, as set forth in the following claims.

That which is claimed is:

1. A method of grouping cells of a radio communications network, the method comprising:
    defining first and second groups of cells from a plurality of cells that transmit reference signals for positioning measurements wherein the first and second groups of cells are defined according to a characteristic of the reference signals transmitted by the respective cells and/or of the respective cells that transmit the reference signals;
    measuring reference signals used for positioning measurements from the cells of the first group at a positioning target device; and
    measuring reference signals used for positioning measurements from the cells of the second group at the positioning target device separately in time and/or separately in frequency from measuring the reference signals from the cells of the first group.

2. A method according to claim 1 wherein the characteristic accounts for reference signal availability so that the reference signals transmitted by the respective cells of the first group are measured at the positioning target device during one or more of first positioning occasions, and so that the reference signals transmitted by the respective cells of the second group are measured at the positioning target device during one or more of second positioning occasions different than the first positioning occasions.

3. A method according to claim 1 wherein defining the plurality of cells comprises receiving a list of the plurality of cells at the positioning target device from the radio communications network, wherein the list defines an order of the cells, the method further comprising:
    reporting the respective available positioning measurements from the positioning target device to the radio communications network in an order corresponding to the order defined by the list received from the radio communications network.

4. A method according to claim 3 wherein reporting the respective available positioning measurements comprises reporting the respective available positioning measurement from the positioning target device through a serving cell to a positioning server.

5. A method according to claim 1 wherein the cells of the first group are similar with respect to the characteristic and wherein the cells of the second group are similar with respect to the characteristic, and wherein the cells of the first and second groups are different with respect to the characteristic.

6. A method according to claim 5 wherein the characteristic is based on at least one of cell maximum transmit power, cell bandwidth, reference signal transmit bandwidth, cell transmitter location, estimated distance between positioning target device and cell transmitter, cell transmitter geographical geometry, cell type, timing of cell transmissions of reference signals to be used for positioning measurements, signal quality, received signal strength, expected reference signal time difference, cell radio access technology, cell frequency, cell carrier status, cell operator, number of cell transmit antennas, carrier frequency, cell carrier type, service cost, reference signal muting information, cell identity, and/or reference signal pattern.

7. A method according to claim 5 wherein the characteristic is based on estimated received signal strengths of the reference signals at an estimated location of the positioning target device.

8. A method according to claim 5 wherein the characteristic comprises a metric such that values of the metric for the cells of the first group are on a first side of a threshold for the metric and such that values of the metric for the cells of the second group are on a second side of the threshold for the metric.

9. A method according to claim 1 wherein defining the first and second groups comprises receiving cell identities of the plurality of the cells in an ordered list from the radio communications network, defining a group of n cells corresponding to a sequence of n cell identities in the ordered list where n is an integer, and defining a group of m cells corresponding to a sequence of m cell identities in the ordered list where m is an integer.

10. A method according to claim 1 wherein defining the first and second groups comprises,
    selecting a subset of the plurality of cells according to a first characteristic, and
    assigning cells from the subset to the first and second groups according to a second characteristic so that the cells of the first group are similar with respect to the second characteristic and so that the cells of the second group are similar with respect to the second characteristic, and so that the cells of the first and second groups are different with respect to the second characteristic.

11. A method according to claim 1 further comprising:
    reporting the positioning measurements from the positioning target device to the radio communications network; and
    after reporting the positioning measurements, maintaining cell identifications of the first and second groups of cells and groupings thereof in memory of the positioning target device.

12. A method according to claim 11 further comprising:
    after reporting the positioning measurements, measuring a reference signal from at least one of the cells of the first and second groups using at least one of the cell identifications of the first and second groups of cells and groupings thereof maintained in the memory.

13. A method according to claim 1 wherein the positioning target device comprises a first mobile user terminal, the method further comprising:

transmitting the cell identifications of the first and second groups of cells and groupings thereof from the first mobile user terminal to a second mobile user terminal.

14. A terminal comprising:

a processor configured to define first and second groups of cells from a plurality of cells that transmit reference signals for positioning measurement, wherein the first and second groups of cells are defined according to a characteristic of the reference signals transmitted by the respective cells and/or of the respective cells that transmit the reference signals; and a receiver coupled to the processor, wherein the receiver is configured to receive reference signals used for positioning measurements from the cells of the first group, and wherein the receiver is configured to receive reference signals used for positioning measurements from the cells of the second group, and wherein the processor is configured to measure the reference signals received from the cells of the first group, and wherein the processor is configured to measure the reference signals received from the cells of the second group separately in time and/or separately in frequency from measuring the reference signals from the cells of the first group.

15. A terminal according to claim 14 wherein the characteristic accounts for reference signal availability so that the reference signals transmitted by the respective cells of the first group are measured using through the receiver and/or processor during one or more of first positioning occasions, and so that the reference signals transmitted by the respective cells of the second group are measured using the receiver and/or processor during one or more of second positioning occasions different than the first positioning occasions.

16. A terminal according to claim 14 wherein the receiver and/or the processor are further configured to receive a list of the plurality of cells from a radio communications network, wherein the list defines an order of the cells, the user terminal further comprising:

a transmitter coupled to the processor, wherein the processor and/or the transmitter are configured to report the respective available positioning measurements to the radio communications network in an order corresponding to the order defined by the list received from the radio communications network.

17. A terminal according to claim 14 further comprising:

a transmitter coupled to the processor, wherein the processor and/or the transmitter are configured to report the positioning measurements to the radio communications network; and a memory coupled to the processor, wherein the memory is configured to maintain cell identifications of the first and second groups of cells and groupings thereof after reporting the positioning measurements.

18. A terminal according to claim 17 wherein the receiver and/or processor are is configured to measure a reference signal from at least one of the cells of the first and second groups using at least one of the cell identifications of the first and second groups of cells and groupings thereof maintained in the memory after reporting the positioning measurements to the radio communications network.

19. A terminal according to claim 14 wherein the terminal comprises a first mobile user terminal, the method further comprising:

Transmitting the cell identifications of the first and second groups of cells and groupings thereof from the first mobile user terminal to a second mobile user terminal.

20. A method of providing communications in a radio communications network, the method comprising:

generating assistance data including an ordered list of cell identities for cells that transmit reference signals used for positioning measurements, wherein the cell identities are ordered according to a plurality of groups of cells to be used for position measurements at a positioning target device, wherein the plurality of groups include first and second groups defined according to a characteristic of the reference signals transmitted by the respective cells and/or of the respective cells that transmit the reference signals; and transmitting the assistance data including the ordered list of cell identities to the positioning target device.

21. A method according to claim 20 further comprising:

receiving positioning measurements from the positioning target device wherein each of the positioning measurements corresponds to a respective one of the cell identities, and wherein the positioning measurements are received in an order corresponding to an order defined by the ordered list of cell identities.

22. A method according to claim 21 further comprising:

before receiving the positioning measurements, allocating a first time interval for the positioning target device to transmit positioning measurements corresponding to the reference signals transmitted by the first group of cells and allocating a second time interval for the positioning target device to transmit the positioning measurements corresponding to the reference signals transmitted by the second group of cells;

wherein receiving the positioning measurements comprises receiving the positioning measurements corresponding to the reference signals transmitted by the first group of cells during the first time interval, and receiving the positioning measurements corresponding to the reference signals transmitted by the second group of cells during the second time interval.

23. A method according to claim 20 wherein the characteristic accounts for reference signal availability so that the reference signals transmitted by the respective cells of the first group are transmitted during a first positioning occasion, and so that the reference signals transmitted by the respective cells of the second group are transmitted during a second positioning occasion different than the first positioning occasion.

24. A method according to claim 20 wherein the characteristic is based on at least one of cell maximum transmit power, cell bandwidth, reference signal transmit bandwidth, cell transmitter location, estimated distance between positioning target device and cell transmitter, cell transmitter geographical geometry, cell type, timing of cell transmissions of reference signals to be used for positioning measurements, signal quality, received signal strength, expected reference signal time difference, cell radio access technology, cell frequency, cell carrier status, cell operator, number of cell transmit antennas, carrier frequency, cell carrier type, service cost, reference signal muting information, cell identity, and/or reference signal pattern.

25. A method according to claim 20 wherein the characteristic is based on estimated received signal strengths of the reference signals at an estimated location of the positioning target device.

26. A method according to claim 20 wherein the characteristic comprises a metric such that values of the metric for the cells of the first group are on a first side of a threshold for the metric and such that values of the metric for the cells of the second group are on a second side of the threshold for the metric.

27. A method according to claim 20 wherein a first group of cells comprises a group of n cells corresponding to n consecutive cell identities in the ordered list where n is an integer, and wherein a second group of cells comprises a group of m cells corresponding to m consecutive cell identities in the ordered list where m is an integer.

28. A radio communications network comprising:
a network element configured to generate assistance data including an ordered list of cell identities for cells that transmit reference signals used for positioning measurements, wherein the cell identities are ordered according to a plurality of groups of cells to be used for position measurements at a positioning target device, wherein the plurality of groups include first and second groups defined according to a characteristic of the reference signals transmitted by the respective cells and/or of the respective cells that transmit the reference signals, and wherein the positioning server is configured to transmit the assistance data including the ordered list of cell identities to the positioning target device.

29. A radio communications network according to claim 28 wherein the network element comprises a positioning server configured to generate the assistance data.

30. A radio communications network according to claim 28 further comprising:
a network node configured to receive positioning measurements from the positioning target device wherein each of the positioning measurements corresponds to a respective one of the cell identities, and wherein the positioning measurements are received in an order corresponding to an order defined by the ordered list of cell identities.

31. A radio communications network according to claim 30 wherein the network node is further configured to allocate first and second time intervals for the positioning target device to transmit positioning measurements corresponding to the reference signals transmitted by the respective first and second groups of cells, before receiving the positioning measurements, and wherein the network node is configured to receive the positioning measurements corresponding to the reference signals transmitted by the first group of cells during the first time interval, and to receive the positioning measurements corresponding to the reference signals transmitted by the second group of cells during the second time interval.

32. A radio communications network according to claim 28 wherein the characteristic accounts for reference signal availability so that the reference signals transmitted by the respective cells of the first group are transmitted during a first positioning occasion, and so that the reference signals transmitted by the respective cells of the second group are transmitted during a second positioning occasion different than the first positioning occasion.

33. A method of grouping cells of a radio communications network, the method comprising:
defining an order of cells from a plurality of cells that transmit reference signals for positioning measurements wherein the order of cells is defined according to estimated received signal strengths of the reference signals at an estimated location of a positioning target device;
measuring the reference signals used for positioning measurements from the cells at the positioning target device.

34. A method according to claim 33 wherein defining the order of the cells comprises receiving a list of the plurality of cells at the positioning target device from the radio communications network, wherein the list defines the order, the method further comprising:
reporting the respective available positioning measurements from the positioning target device to the radio communications network in an order corresponding to the order defined by the list received from the radio communications network.

35. A method of providing communications in a radio communications network, the method comprising:
generating assistance data including an ordered list of cell identities for cells that transmit reference signals used for positioning measurements, wherein the cell identities are ordered according to estimated received signal strengths of the reference signals at an estimated location of the positioning target device; and
transmitting the assistance data including the ordered list of cell identities to the positioning target device.

36. A method according to claim 35 further comprising: receiving positioning measurements form the positioning target device wherein each of the positioning measurements corresponds to a respective one of the cell identities, and wherein the positioning measurements are received in an order corresponding to an order defined by the ordered list of cell identities.

* * * * *